(12) United States Patent
Asai et al.

(10) Patent No.: US 7,606,531 B2
(45) Date of Patent: Oct. 20, 2009

(54) REPEATING STATION, A COMMUNICATION APPARATUS, AND A DIRECTIVITY CONTROL METHOD

(75) Inventors: Takahiro Asai, Yokosuka (JP); Tatsuo Furuno, Zushi (JP); Tetsu Tanaka, Zushi (JP); Hirohito Suda, Yokosuka (JP)

(73) Assignee: NTT DoCoMo, Inc., Tokyo (JP)

( * ) Notice: Subject to any disclaimer, the term of this patent is extended or adjusted under 35 U.S.C. 154(b) by 615 days.

(21) Appl. No.: 11/172,951

(22) Filed: Jul. 5, 2005

(65) Prior Publication Data
US 2006/0003697 A1 Jan. 5, 2006

(30) Foreign Application Priority Data
Jul. 5, 2004 (JP) ............... 2004-198049

(51) Int. Cl.
H04B 1/60 (2006.01)
(52) U.S. Cl. .................. 455/11.1; 342/352; 343/853; 370/316
(58) Field of Classification Search ............. 455/11.1
See application file for complete search history.

(56) References Cited

U.S. PATENT DOCUMENTS

| | | | | |
|---|---|---|---|---|
| 4,901,307 A | * | 2/1990 | Gilhousen et al. | 370/320 |
| 5,347,286 A | * | 9/1994 | Babitch | 342/359 |
| 5,619,210 A | * | 4/1997 | Dent | 342/352 |
| 5,652,750 A | * | 7/1997 | Dent et al. | 370/326 |
| 5,697,052 A | * | 12/1997 | Treatch | 455/20 |
| 5,815,795 A | * | 9/1998 | Iwai | 455/9 |
| 5,854,605 A | * | 12/1998 | Gildea | 342/357.03 |
| 5,862,495 A | * | 1/1999 | Small et al. | 701/13 |
| 5,907,578 A | * | 5/1999 | Pon et al. | 375/150 |
| 6,009,376 A | * | 12/1999 | Brodie et al. | 701/226 |
| 6,058,307 A | * | 5/2000 | Garner | 455/428 |
| 6,088,570 A | * | 7/2000 | Komara et al. | 455/11.1 |
| 6,088,592 A | * | 7/2000 | Doner et al. | 455/447 |
| 6,107,963 A | * | 8/2000 | Ohmi et al. | 342/383 |
| 6,188,873 B1 | * | 2/2001 | Wickman et al. | 455/11.1 |
| 6,353,734 B1 | * | 3/2002 | Wright et al. | 455/98 |
| 6,356,437 B1 | * | 3/2002 | Mitchell et al. | 361/679.03 |
| 6,389,263 B1 | * | 5/2002 | Schmidt De Andrade | 455/11.1 |
| 6,397,083 B2 | * | 5/2002 | Martin et al. | 455/562.1 |
| 6,400,306 B1 | * | 6/2002 | Nohara et al. | 342/25 R |
| 6,430,391 B1 | * | 8/2002 | Dent et al. | 455/11.1 |
| 6,437,746 B1 | * | 8/2002 | Van Hoozen | 343/702 |

(Continued)

FOREIGN PATENT DOCUMENTS

JP 2000-324033 11/2000

(Continued)

Primary Examiner—Duc Nguyen
Assistant Examiner—Hai V Nguyen
(74) Attorney, Agent, or Firm—Oblon, Spivak, McClelland, Maier & Neustadt, L.L.P.

(57) ABSTRACT

A repeating station, a communication apparatus, and an antenna directivity control method are disclosed. The repeating station includes
a first antenna group including at least one antenna element,
a second antenna group that is different from the first antenna group, the second antenna group including two or more antenna elements adjusted so that radiation in the direction of the first antenna group is reduced, wherein the second antenna group is adjusted such that radiated power in the direction of the first antenna group is reduced.

14 Claims, 18 Drawing Sheets

U.S. PATENT DOCUMENTS

| | | | |
|---|---|---|---|
| 6,466,766 B1* | 10/2002 | Treatch | 455/20 |
| 6,615,021 B1* | 9/2003 | Lovinggood et al. | 455/11.1 |
| 6,640,111 B1* | 10/2003 | Shapira | 455/562.1 |
| 6,697,603 B1* | 2/2004 | Lovinggood et al. | 455/13.1 |
| 6,731,904 B1* | 5/2004 | Judd | 455/11.1 |
| 6,731,905 B2* | 5/2004 | Ogino et al. | 455/11.1 |
| 6,865,388 B2* | 3/2005 | Walsh et al. | 455/428 |
| 6,928,048 B1* | 8/2005 | Do et al. | 370/208 |
| 6,931,030 B1* | 8/2005 | Dogan | 370/509 |
| 7,071,874 B2* | 7/2006 | Doi | 342/377 |
| 7,107,012 B2* | 9/2006 | Kashiwagi et al. | 455/63.4 |
| 7,139,527 B2* | 11/2006 | Tamaki et al. | 455/16 |
| 7,164,739 B1* | 1/2007 | Trott | 375/347 |
| 7,209,707 B2* | 4/2007 | Iwami et al. | 455/63.4 |
| 7,215,926 B2* | 5/2007 | Corbett et al. | 455/41.2 |
| 7,233,771 B2* | 6/2007 | Proctor et al. | 455/11.1 |
| 7,274,330 B2* | 9/2007 | Lee | 342/374 |
| 7,379,744 B2* | 5/2008 | Tamaki et al. | 455/456.5 |
| 7,400,856 B2* | 7/2008 | Sartori et al. | 455/7 |
| 7,417,440 B2* | 8/2008 | Peschmann et al. | 324/637 |
| RE40,479 E* | 9/2008 | Wright et al. | 455/98 |
| 2002/0008672 A1* | 1/2002 | Gothard et al. | 343/893 |
| 2002/0013164 A1* | 1/2002 | Leifer et al. | 455/562 |
| 2002/0032031 A1* | 3/2002 | Ogino et al. | 455/435 |
| 2002/0042290 A1* | 4/2002 | Williams et al. | 455/562 |
| 2002/0122498 A1* | 9/2002 | Dogan | 375/259 |
| 2002/0150182 A1* | 10/2002 | Dogan et al. | 375/343 |
| 2002/0172183 A1* | 11/2002 | Eichinger et al. | 370/343 |
| 2003/0133413 A1* | 7/2003 | Mehravari | 370/235 |
| 2004/0077379 A1* | 4/2004 | Smith et al. | 455/562.1 |
| 2004/0110469 A1* | 6/2004 | Judd et al. | 455/15 |
| 2004/0132454 A1* | 7/2004 | Trott et al. | 455/447 |
| 2004/0136334 A1* | 7/2004 | Heiman et al. | 370/316 |
| 2004/0147287 A1* | 7/2004 | Nelson, Jr. et al. | 455/561 |
| 2004/0235527 A1* | 11/2004 | Reudink et al. | 455/561 |
| 2005/0057394 A1* | 3/2005 | Lee | 342/374 |
| 2005/0059342 A1* | 3/2005 | Engels et al. | 455/7 |
| 2005/0075139 A1* | 4/2005 | Shapira | 455/562.1 |
| 2005/0085192 A1* | 4/2005 | Iwami et al. | 455/67.16 |
| 2005/0124346 A1* | 6/2005 | Corbett et al. | 455/446 |
| 2005/0202859 A1* | 9/2005 | Johnson et al. | 455/575.7 |
| 2005/0232217 A1* | 10/2005 | Do et al. | 370/343 |
| 2005/0239507 A1* | 10/2005 | Doi | 455/562.1 |
| 2006/0003697 A1* | 1/2006 | Asai et al. | 455/11.1 |
| 2006/0062140 A1* | 3/2006 | Sudo | 370/203 |
| 2006/0250935 A1* | 11/2006 | Hamamoto et al. | 370/203 |
| 2007/0066220 A1* | 3/2007 | Proctor et al. | 455/11.1 |
| 2007/0135042 A1* | 6/2007 | Shiff et al. | 455/13.3 |
| 2007/0155314 A1* | 7/2007 | Mohebbi | 455/11.1 |
| 2007/0232227 A1* | 10/2007 | Draganov et al. | 455/11.1 |
| 2007/0270155 A1* | 11/2007 | Nelson et al. | 455/452.2 |
| 2008/0030400 A1* | 2/2008 | Lee | 342/155 |

FOREIGN PATENT DOCUMENTS

| | | |
|---|---|---|
| JP | 2001-211027 | 8/2001 |
| JP | 2001-223628 | 8/2001 |
| JP | 2003-198442 | 7/2003 |

\* cited by examiner

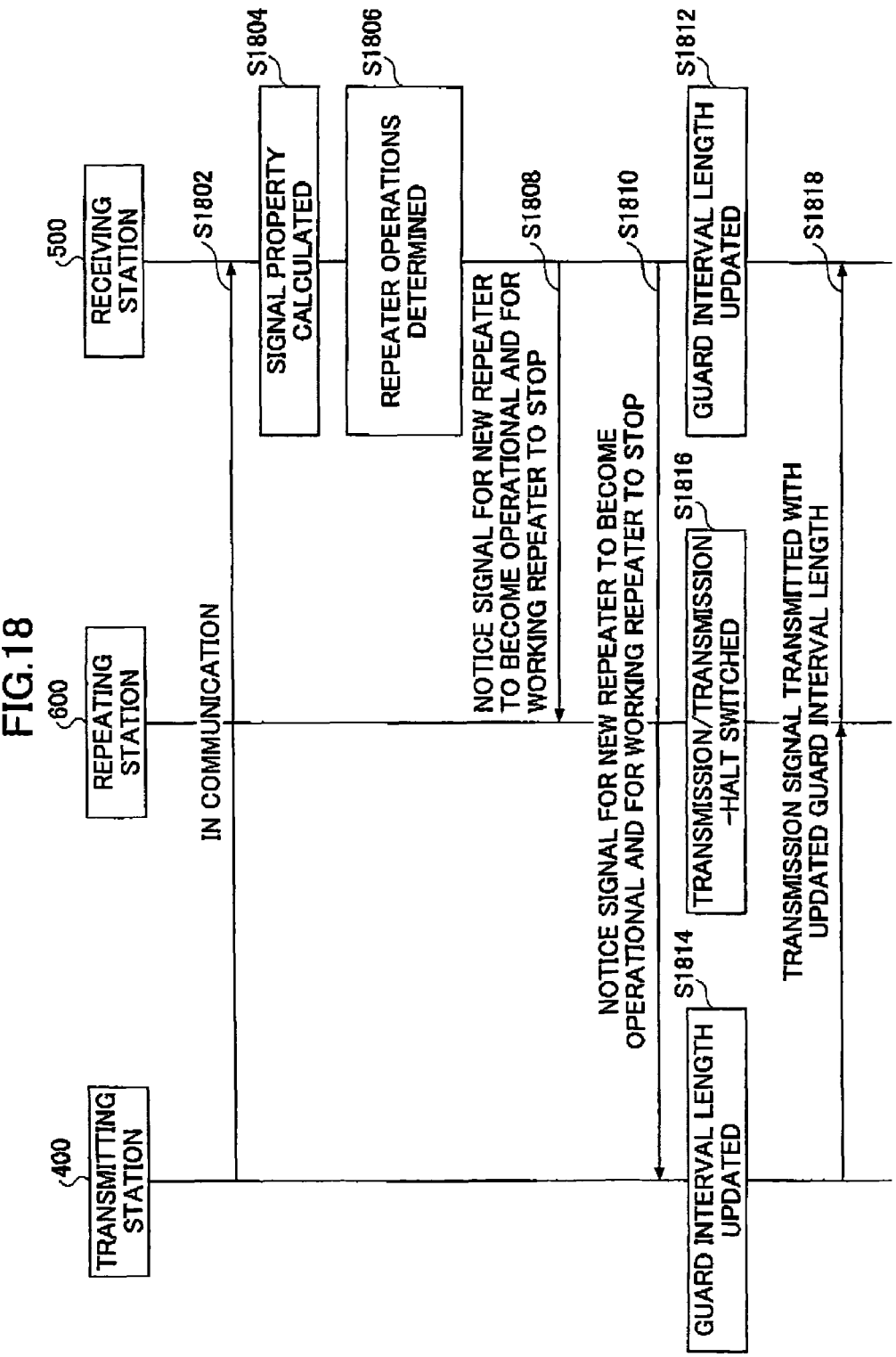

REPEATING STATION, A COMMUNICATION APPARATUS, AND A DIRECTIVITY CONTROL METHOD

BACKGROUND OF THE INVENTION

1. Field of the Invention

The present invention relates to a repeating station (repeater), a communication apparatus, and a directivity control method for relaying and amplifying a radio signal in mobile communications.

2. Description of the Related Art

In mobile communication systems using an electric wave such as a cellular phone system, there is a problem in that communications are not available out of radio coverage, e.g., in a tunnel. In order to cope with such situations, a radio repeating station, often called a repeater or a booster, is employed. Repeaters are used not only as a measure to expand radio coverage, but also in order to provide a multi-path propagation environment such that the channel capacity of MIMO (Multiple Input Multiple Output) communications is increased, the MIMO communications providing high frequency efficiency in a non-line-of-sight propagation environment.

The configuration of the repeater is described with reference to FIGS. 1A and 1B.

FIG. 1A shows the configuration of a direct relay method wherein a signal received by a receiving antenna is amplified by a low noise amplifier (LNA) and a high power amplifier (HPA), and the amplified signal is transmitted from a transmitting antenna. According to the direct relay method, the frequency of transmission is the same as that of reception; for this reason, its frequency efficiency is high, and it has an advantage in that the configuration is simple. However, a loop interference may take place by the signal feeding back from the transmitting antenna to the receiving antenna, which is a problem in that the gain of the amplifiers cannot be made great.

FIG. 1B shows the configuration of a heterodyne relay method wherein a first signal frequency is received by the receiving antenna, the signal is converted to an intermediate frequency, amplified, and is then converted to a second frequency for transmission. According to this method, the frequency of transmission and the frequency of reception differ; for this reason, there is no feedback from the transmission antenna to the receiving antenna, and sufficient amplification can be provided. However, since two frequencies are used, the frequency efficiency is degraded.

Next, a method of increasing the channel capacity of MIMO communications in a line-of-sight environment by a repeater is described (for example, Patent Reference 1 refers). The MIMO communications employ spatial multiplexing, wherein different data streams are transmitted from i antennas, and are simultaneously received by j antennas (i and j are positive integers). Accordingly, under a multi-path propagation environment wherein two or more independent propagation paths are available between transmission and reception, the channel capacity is increased. However, in a propagation environment where the transmitting station and the receiving station are in line-of-sight, independent propagation paths are difficult to obtain, and the channel capacity is degraded.

FIG. 2 shows a radio communications system that includes repeaters for artificially arranging a multi-path propagation environment in order to increase the channel capacity in the line-of-sight environment.

The radio communications system includes a first radio station (transmitting station), two or more second radio stations (repeaters), and a third radio station (receiving station).

A signal is transmitted from the transmission antennas of the first radio station (transmitting station), and received by the second radio stations (repeaters). Each of the repeaters stores the received signal in a buffer, and transmits the signal after a delay of a predetermined period. Consequently, the signals stored in the buffers are simultaneously transmitted from the repeaters. The signals transmitted from the repeaters are then received by the third radio station (receiving station). The receiving station restores the signal transmitted by performing signal separation of the received signals. In this manner, a multi-path propagation is obtained in the line-of-sight propagation environment, and the channel capacity is increased. However, according to this method, the repeaters transmit by time division, i.e., at a timing that is different from the transmitting station. Consequently, the amount of signals that can be transmitted is approximately halved in comparison with the case where no time division is used, and a transmission delay is inevitable.

In mobile communications, transmission speed keeps increasing, and frequency efficiency is required. Further, information to be transmitted is of a real time nature, i.e., requires the least possible delay. In other words, repeaters to be applied to future mobile communications are required to provide high frequency efficiency, and the smallest possible delay. From this viewpoint, the direct relay method shown in FIG. 1A is suitable as the relaying method; however, there is the problem of the loop interference between the antennas if great amplification is required.

According to the conventional direct relay method, the directivity of an antenna is set in the direction of a base station, and the directivity of an antenna on the other side is set in the direction of a terminal, such that the directional gain between the antennas is reduced. Further, feedback between the antennas is prevented by providing a sufficient distance between the antennas such that propagation loss increases. However, the position of the terminal, which is often in motion, is unknown; therefore, the antenna directivity of the repeater on the side of the terminal is desired to be omni-directional in the horizontal plane.

In the case wherein the repeaters are used in order to realize a multi-path environment for MIMO communications, it is further desirable that the antenna provided on the base station side of the repeater be omni-directional so that the number of propagation paths between the base station and the repeater is increased. When the channel capacity is to be increased in the MIMO communications under line-of-sight conditions, it is seldom necessary to provide a great amplification factor. Nevertheless, in the case of the repeater using the direct relay method, the omni-directional antennas provided to both transmission and reception cause the transmission signal to be fed back to the receiving antenna, i.e., a loop interference takes place.

[Patent Reference 1] JPA 2003-198442

[Problem(s) to be Solved by the Invention]

As described above, problems in the background technology are as follows.

As for the repeater for mobile communications, the direct relay method is suitable from the viewpoint of the frequency efficiency and the transmission delay. Further, when the repeater is to be applied to the MIMO communications for providing a multi-path propagation environment, the omni-directional antennas for transmission and reception are desirable.

However, when using the omni-directional antennas for transmission and reception with the direct relay method, the loop interference takes place from the transmission antenna to the reception antenna, causing an oscillation.

SUMMARY OF THE INVENTION

Accordingly, the present invention aims at offering a repeating station (repeater), a communication apparatus, and a directivity control method that substantially obviate one or more of the problems caused by the limitations and disadvantages of the related art.

Specifically, the present invention aims at offering a repeating station (repeater), a communication apparatus, and a directivity control method whereby a signal is transmitted by an antenna having an almost-omni-directional pattern while feedback of the signal from the transmitting antenna to the receiving antenna is reduced.

Features and advantages of the present invention are set forth in the description that follows, and in part will become apparent from the description and the accompanying drawings, or may be learned by practice of the invention according to the teachings provided in the description. Objects as well as other features and advantages of the present invention will be realized and attained by a repeating station (repeater), a communication apparatus, and a directivity control method particularly pointed out in the specification in such full, clear, concise, and exact terms as to enable a person having ordinary skill in the art to practice the invention.

To achieve these and other advantages and in accordance with the purpose of the invention, as embodied and broadly described herein, the invention provides as follows.

[Means for Solving the Problem]

In order to solve the above-mentioned problems, the repeating station of the present invention includes a first antenna group including at least one antenna element, a second antenna group different from the first antenna group including two or more antenna elements adjusted so that the radiation output in the direction of the first antenna group is reduced, wherein the second antenna group is adjusted so that gain in the direction of the first antenna group is reduced.

By arranging the repeater as described above, the feedback from the second antenna group to the first antenna group is reduced, and a transmitting antenna pattern that is almost omni-directional is obtained as a total antenna pattern.

According to another aspect of the present invention, the repeater includes the first antenna group including at least one antenna element, the second antenna group including two or more adaptive array antennas containing two or more antenna elements, a received-power measuring unit for measuring power of a signal received by the first antenna group, the signal being transmitted from the second antenna group, and a weight calculating unit for calculating transmission weights that are multiplied by corresponding signals to be transmitted such that the output of each adaptive array antenna in the radiation direction causing the feedback to the first antenna group is reduced, and the output in other directions is made uniform based on the measured received power.

By structuring the repeater in this way, the feedback from the second antenna group to the first antenna group is reduced, and the total antenna pattern that is almost omni-directional is obtained.

The communication apparatus according to the present invention includes a received signal property calculating unit for calculating the property of a received signal, and a determining unit for determining whether to start or stop transmission of a signal from the repeater based on the property of the received signal.

In this way, the signal property at the receiving station is improved.

The directivity control method of the present invention includes a step of transmitting a directivity adjustment signal from each antenna element of the second antenna group that includes two or more antenna elements, a step of measuring power of the directivity adjustment signal received by the first antenna group that includes at least one antenna element, and a step of controlling the directivity of each antenna element that constitutes the second antenna group based on the measured received power.

In this way, the directivity of the transmitting antenna can be adaptively adjusted.

[Effect of the Invention]

According to the embodiments of the present invention, the repeating station, the communication apparatus, and the directivity control method are realized, whereby the loop interference from the transmitting antenna to the receiving antenna is reduced, and an almost omni-directional transmission pattern of the antenna is obtained.

BRIEF DESCRIPTION OF THE DRAWINGS

FIG. 18 is a sequence diagram showing operations of a radio communications system according to the embodiment of the present invention.

DESCRIPTION OF THE PREFERRED EMBODIMENTS

In the following, embodiments of the present invention are described with reference to the accompanying drawings. Here, as for the drawings for describing the embodiments, the same reference numbers are given to the same functional units, and descriptions thereof are not repeated.

Figure 1A:
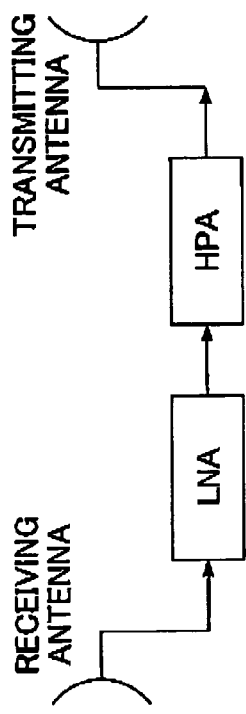
FIG. 1A and FIG. 1B are block diagrams showing configurations of a repeater.
Figure 1B:
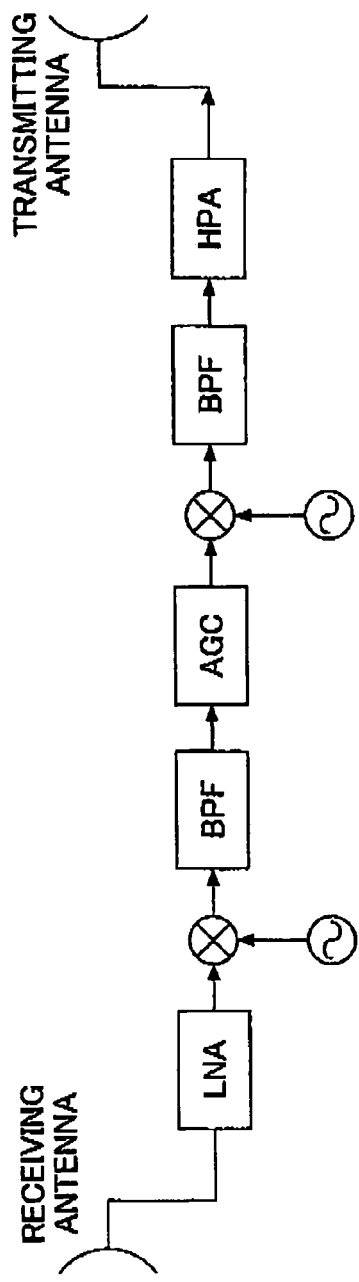
Figure 2:
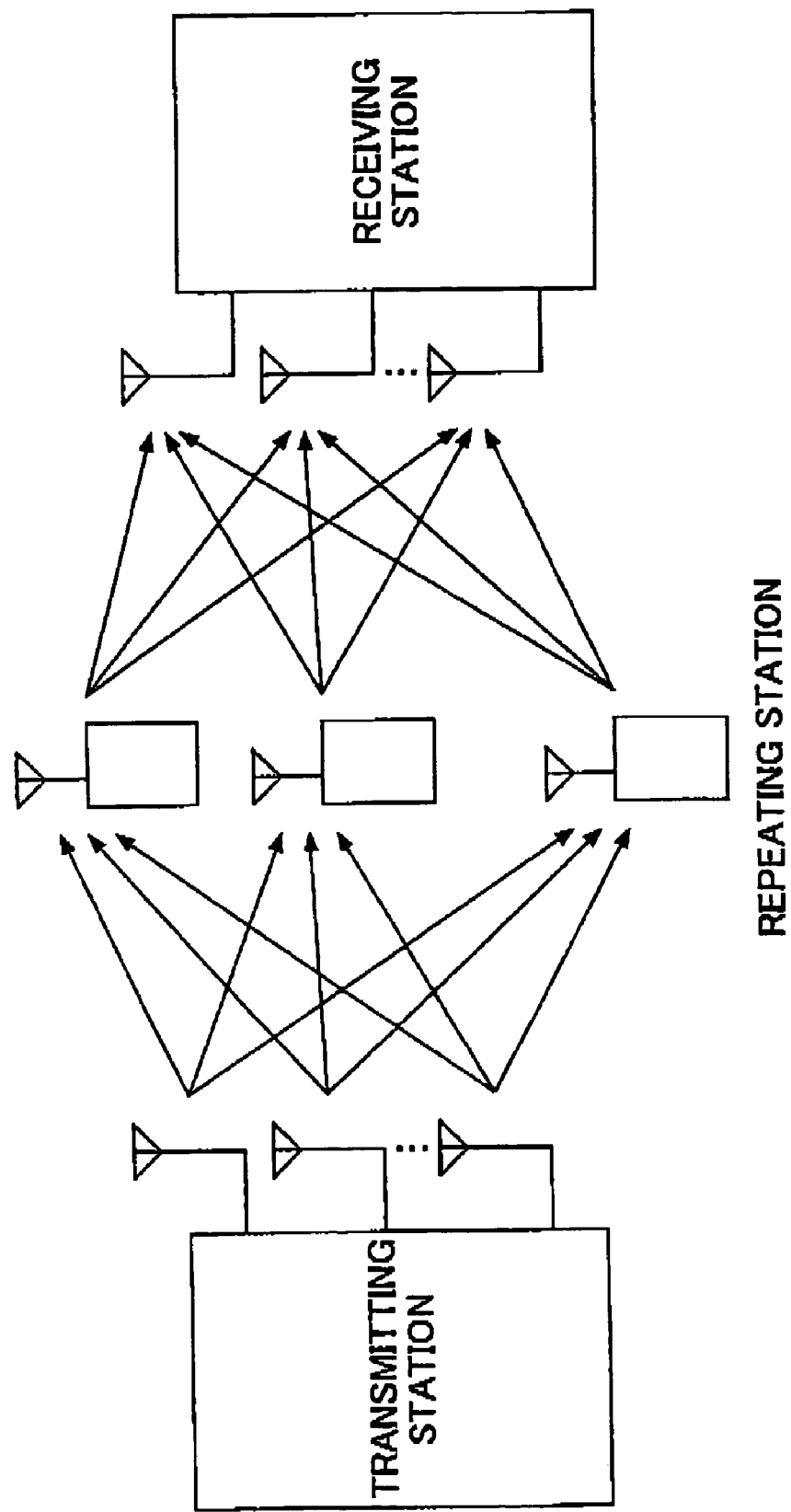
FIG. 2 is a block diagram explaining a relay transmission system of MIMO communications.
Figure 3:
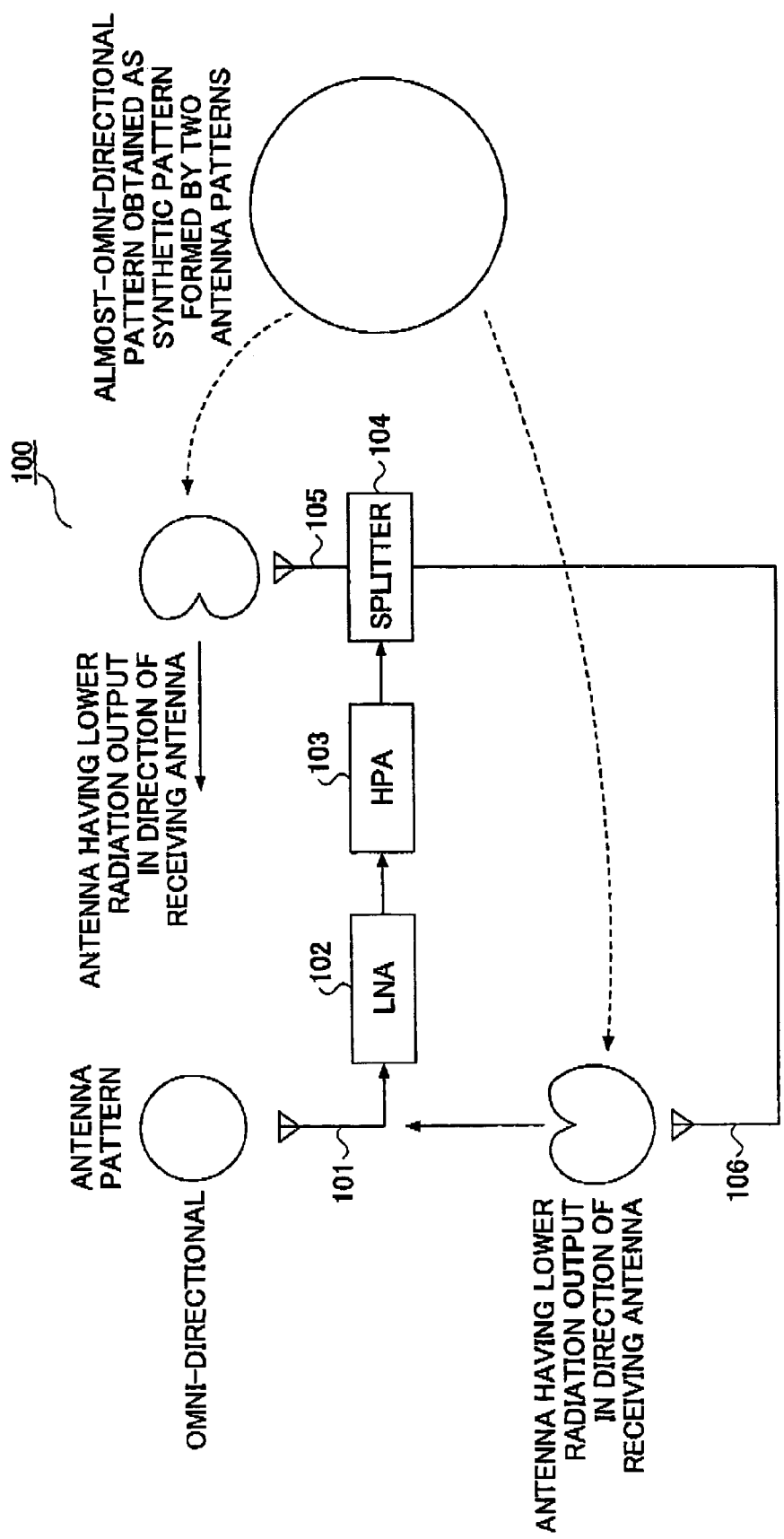
FIG. 3 is a block diagram showing the configuration of the repeater according to an embodiment of the present invention.

A repeater 100 according to the first embodiment of the present invention is described with reference to FIG. 3.

The repeater 100 has two transmitting antennas.

The repeater 100 includes a receiving antenna 101, an LNA 102 connected to the receiving antenna 101, an HPA 103 connected to the LNA 102, a splitter 104 connected to the HPA 103, and transmitting antennas 105 and 106 connected to the splitter 104.

A signal is received by the receiving antenna 101 that is omni-directional, is amplified by the LNA 102, is further amplified by the SPA 103, and then is split into two signals by the splitter 104. The split signals are transmitted from the corresponding transmitting antennas 105 and 106.

In the present embodiment, the transmitting antennas 105 and 106 are designed such that the radiation output in the direction of the receiving antenna 101 is reduced, and the radiation output in other directions is made uniform. The directivity as described can be realized by using, for example, a corner reflector antenna. By configuring in this way, the loop interference from the transmitting antennas to the receiving antenna is reduced.

Further, the transmitting antennas 105 and 106 are installed on the repeater 100 such that the total antenna pattern formed by the transmitting antennas 105 and 106 provides an almost omni-directional transmitting antenna pattern. For example, the direction from the receiving antenna 101 to the transmitting antenna 105 is made approximately orthogonal to the direction from the receiving antenna 101 to the transmitting antenna 106. In this way, the transmitting antenna pattern that is almost omni-direction is synthetically formed by the transmitting antennas 105 and 106.

Although the embodiment is described for the case where there are two transmitting antennas, the number of the transmitting antennas may be greater than two that are similarly arranged, whereby the loop interference can be reduced, and the repeater with the almost omni-directional transmission and reception characteristics can be realized.

Figure 4:
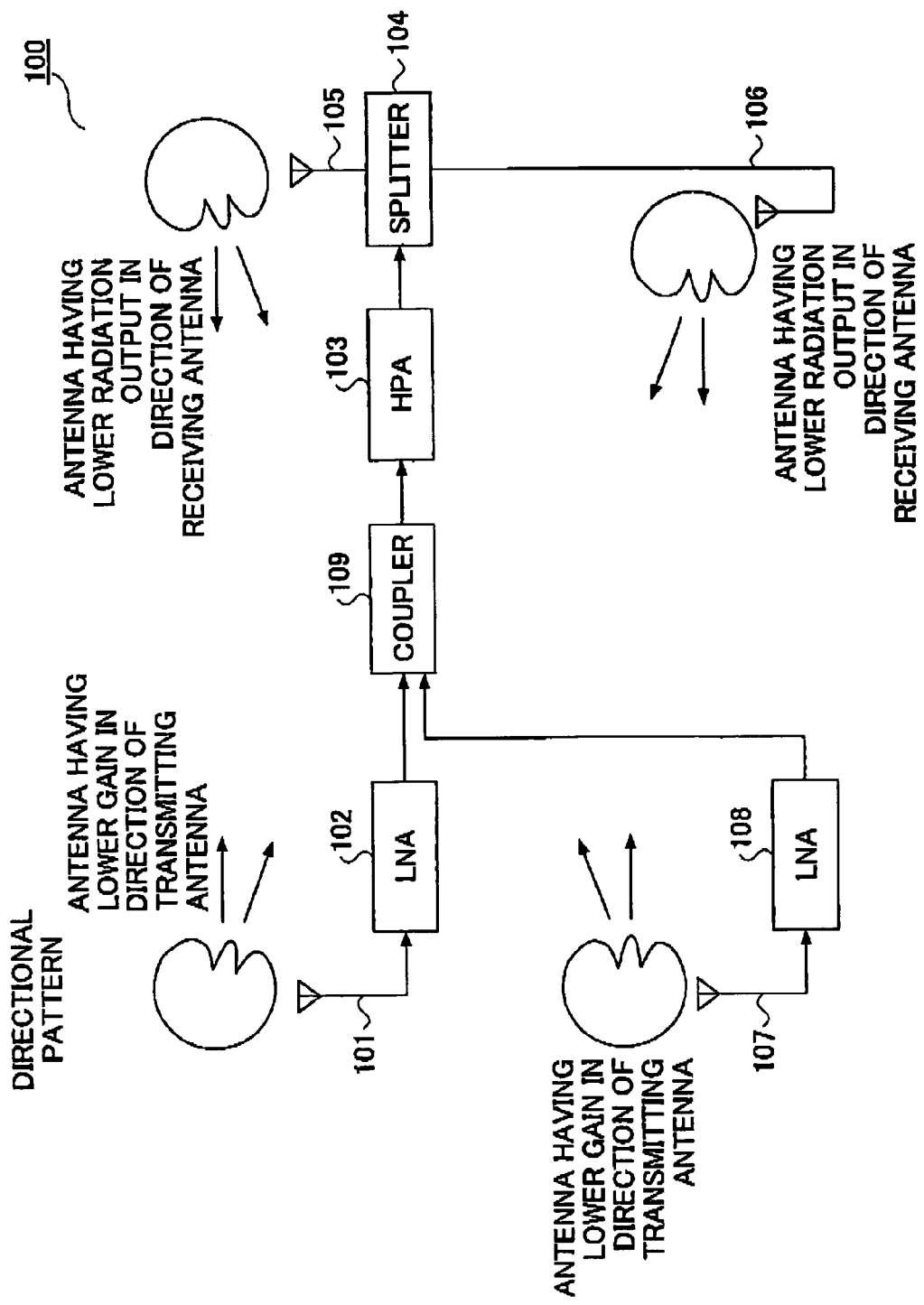
FIG. 4 is a block diagram showing the configuration of the repeater according to the embodiment of the present invention.

Next, a repeater according to the second embodiment of the present invention is described with reference to FIG. 4.

The repeater 100 according to the second embodiment has two receiving antennas and two transmitting antennas.

The repeater 100 according to the second embodiment includes the receiving antenna 101, a receiving antenna 107, the LNA 102 and an LNA 108 connected to the receiving antennas 101 and 107, respectively, a coupler 109 connected to the LNA 102 and the LNA 108, the HPA 103 connected to the coupler 109, the splitter 104 connected to the HPA 103, and the transmitting antennas 105 and 106 connected to the splitter 104.

The signals received by the receiving antennas 101 and 107 are amplified by the LNA 102 and 108, respectively, and are compounded by the coupler 109. The compounded signal is amplified by the HPA 103, split into two signals by the splitter 104, and then transmitted from the corresponding transmitting antennas 105 and 106.

The transmitting antennas 105 and 106 are designed such that the radiation output in the direction to the receiving antennas 101 and 107 is reduced, and the radiation output in other directions is made uniform. Such a directivity pattern is realizable by using, for example, a corner reflector antenna. By constituting the repeater in this way, the loop interference from the transmitting antennas to the receiving antennas is reduced. Further, the transmitting antennas 105 and 106 are arranged so that they form a synthetic antenna pattern that is almost omni-directional.

Further, the gain (amplification factor) of the receiving antennas 101 and 107 for a signal received from the direction of the transmitting antennas is reduced, and the gain for a signal received from other directions is made uniform as much as possible. The receiving antennas are realizable by using, e.g., corner reflector antennas. By constituting the repeater in this way, the loop interference from the transmitting antennas is reduced. Further, the receiving antennas 101 and 107 are arranged so that they form a total antenna pattern that is almost omni-directional.

By using the above configuration, the influence of loop interference is reduced, and a repeater with transmitting antennas and receiving antennas having almost-omni-directional total patterns is realized.

Although the second embodiment is described for the case where the repeater includes two transmitting antennas and two receiving antennas, the same configuration is applicable to the case where the numbers of the transmitting antennas and receiving antennas are greater than 2, wherein the loop interference is reduced and a repeater with the almost-omni-directional transmission and reception characteristics can be realized.

Figure 5:
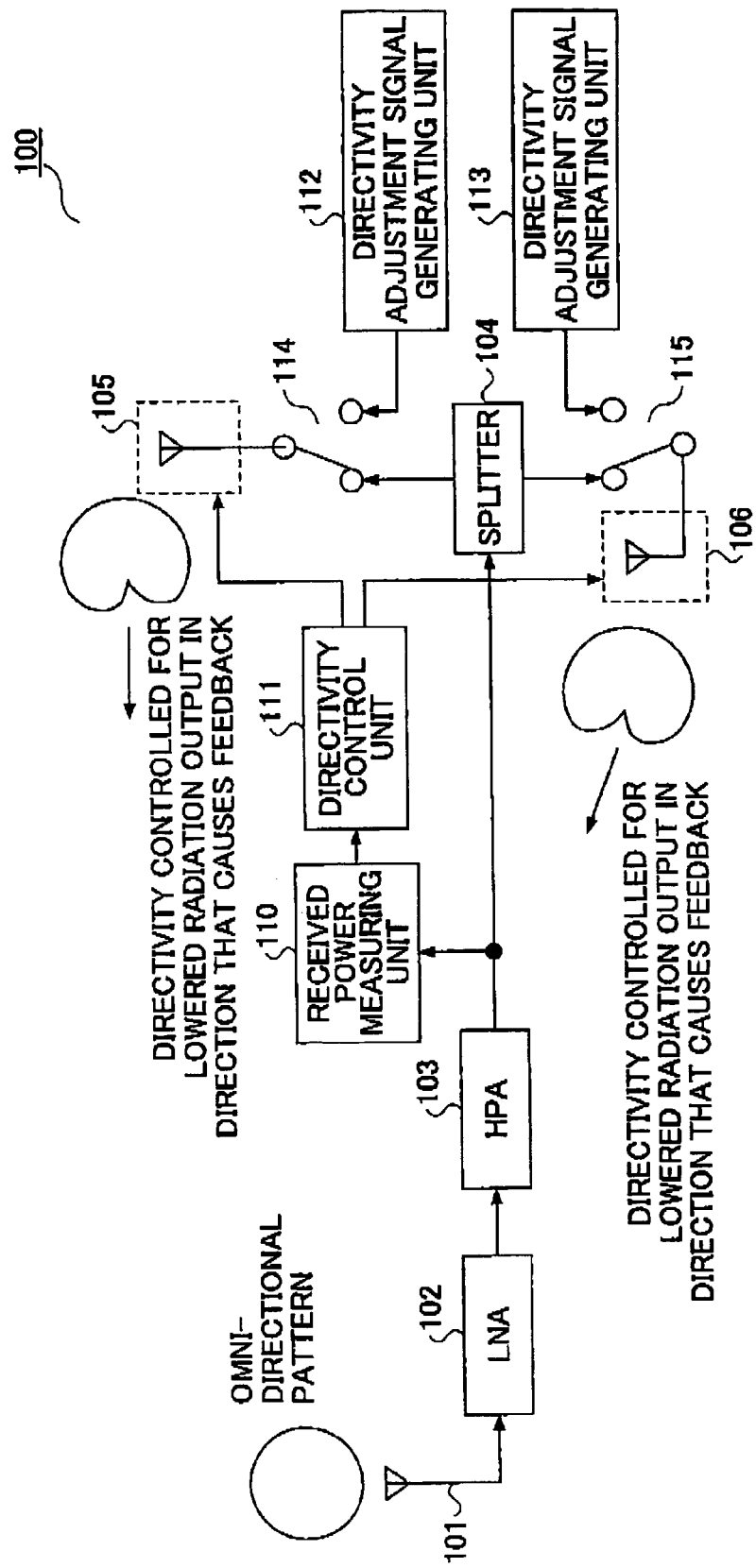
FIG. 5 is a block diagram showing the configuration of the repeater according to the embodiment of the present invention.

Next, a repeater according to the third embodiment of the present invention is described with reference to FIG. 5.

The repeater 100 according to the third embodiment includes the receiving antenna 101, the LNA 102 connected to the receiving antenna 101, the HPA 103 connected to the LNA 102, the splitter 104 and a received-power measuring unit 110 connected to the HPA 103, a directivity control unit 111 connected to the received-power measuring unit 110, the transmitting antennas 105 and 106 connected to the directivity control unit 111, directivity adjustment signal generating units 112 and 113, and switches 114 and 115. Here, the switch 114 is connected to the transmitting antenna 105, and switches between the splitter 104 and the directivity adjustment signal generating unit 112; and the switch 115 is connected to the transmitting antenna 106, and switches between the splitter 104 and the directivity adjustment signal generating unit 113.

As described above, the repeater 100 according to the third embodiment includes the directivity adjustment signal generating units 112 and 113, the received-power measuring unit 110, the directivity control unit 111, and the switches 114 and 115 in addition to the repeater described with reference to FIG. 3.

The directivity of the transmitting antennas 105 and 106 is controlled based on the signal acquired from the directivity control unit 111.

The directivity adjustment signal generating units 112 and 113 are connectable to the transmitting antennas 105 and 106, respectively. The directivity adjustment signal generating units 112 and 113 generate directivity adjustment signals for adjusting the respective transmitting antennas 105 and 106. The received power of the directivity adjustment signals at the receiving antenna 101 is measured by the received-power measuring unit 110. The directivity control unit 111 controls the directivity of each transmitting antenna according to the measured received power. For example, the directivity control unit 111 controls the directivity of the transmitting antennas 105 and 106 so that the received power of the directivity adjustment signals measured by the received-power measuring unit 110 becomes small.

By constituting the repeater in this way, the output of the radiation in a direction that causes the loop interference from the transmitting antennas to the receiving antennas is reduced.

Figure 6:
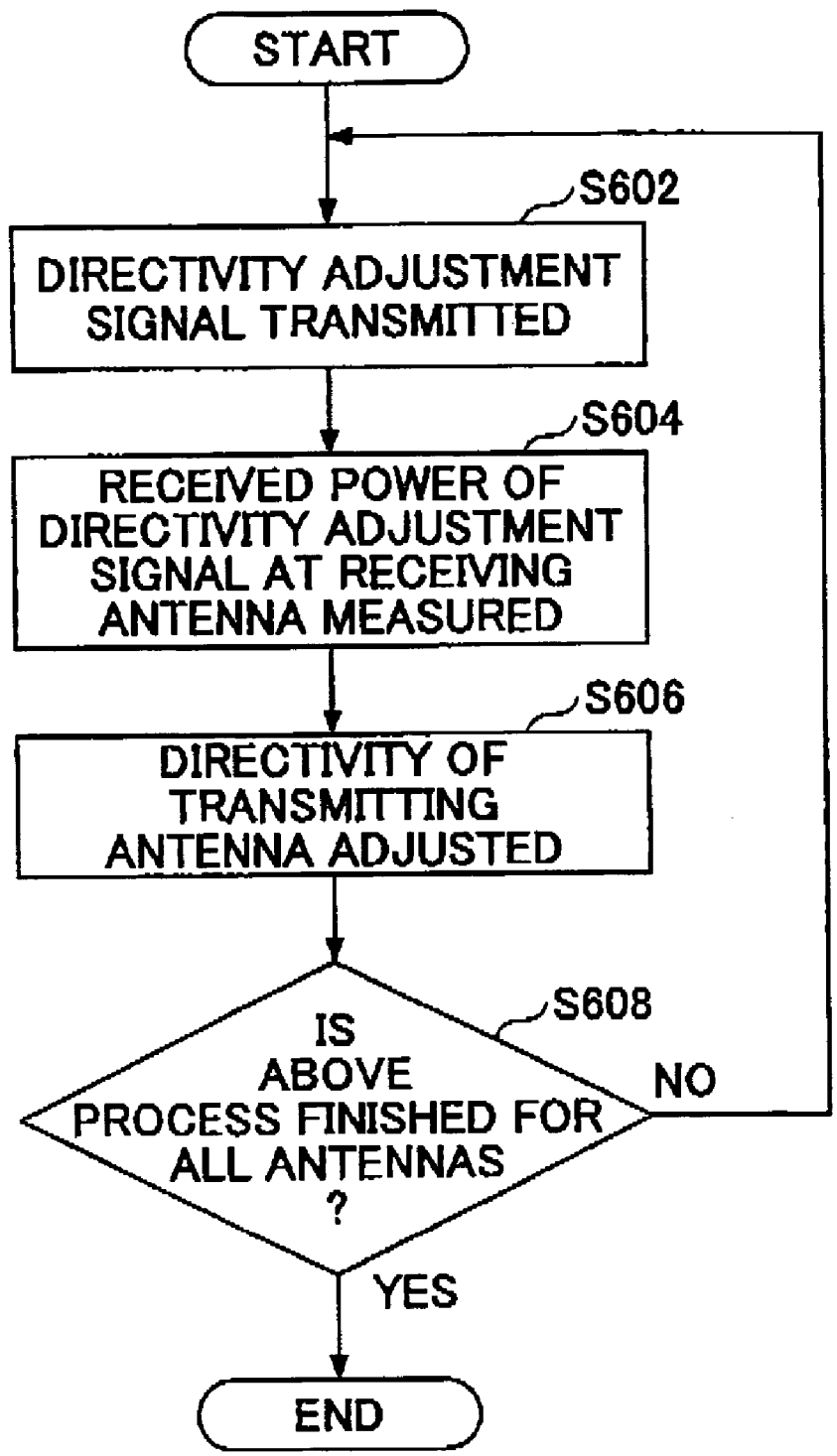
FIG. 6 is a flowchart showing operations of the repeater according to the embodiment of the present invention.

Next, operations in the case of controlling the directivity of the transmitting antenna of the repeater 100 according to the present embodiment are described with reference to FIG. 6.

The directivity adjustment signal generating unit 112 generates the directivity adjustment signal, which is then transmitted through the transmitting antenna 105 (Step S602). The received-power measuring unit 110 measures the received power of the directivity adjustment signal at the receiving antenna 101 (Step S604). Next, the directivity control unit 111 controls the directivity of the transmitting antenna 105 based on the measured received power (Step S606). For example, the directivity control unit 111 controls the directivity of the transmitting antenna 105 so that the received power measured by the received-power measuring unit 110 becomes small.

Next, it is determined whether directivity control has been completed for all the transmitting antennas (Step S608). The process is finished if the directivity control is completed for all the transmitting antennas (YES at Step S608). Otherwise, if the directivity control is not completed for all the transmitting antennas (NO at Step S608), the process returns to Step S602. Then, the directivity control of the transmitting antenna 106, for example, is performed.

The repeater 100 performs directivity control of each transmitting antenna using the directivity adjustment signal when the antenna is installed. Further, the control may be periodically or otherwise performed when the transmission from the transmitting station is stopped.

The direction of a wave that is transmitted from each transmitting antenna, and that causes the loop interference to the receiving antenna 101 changes with the installation location of the repeater 100, and the environment around the repeater 100. By the configuration as described above, the directivity of the transmitting antenna(s) is adaptively adjusted, and the loop interference is reduced when the environment changes.

Although the third embodiment is described for the case where the repeater has two transmitting antennas, the present invention is applicable to the case where more than two transmitting antennas are arranged, wherein the directivity of the transmitting antenna is adaptively adjusted, and the loop interference is reduced according to the environment change.

Figure 7:
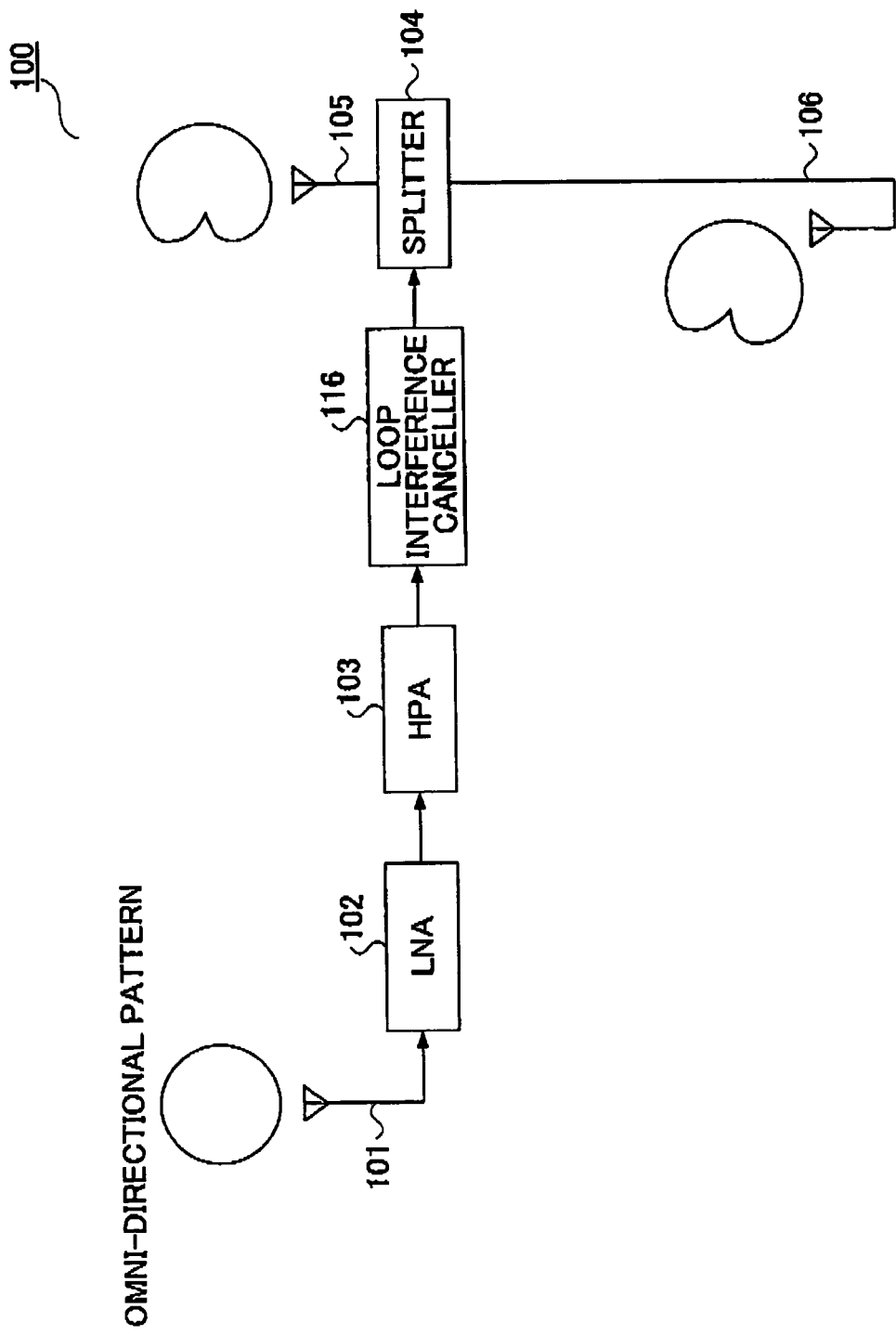
FIG. 7 is a block diagram showing the configuration of the repeater according to the embodiment of the present invention.

Next, a repeater according to the fourth embodiment of the present invention is described with reference to FIG. 7.

The repeater 100 according to the fourth embodiment includes the receiving antenna 101 the LNA 102 connected to the receiving antenna 101, the HPA 103 connected to the LNA 102, a loop interference canceller 116 connected to the HPA 103, the splitter 104 connected to the loop interference canceller 116, and the transmitting antennas 105 and 106 connected to the splitter 104.

The repeater 100 according to the fourth embodiment includes the loop interference canceller 116 in addition to the configuration described with reference to FIG. 3. The directivity of the transmitting antennas of the repeater 100 is adjusted so that the radiation output in the direction to the receiving antenna is reduced as described in the first embodiment. Further, the repeater 100 according to the fourth embodiment uses the loop interference canceller 116. In this way, the loop interference due to the feedback is mitigated.

The radiation direction from the transmitting antenna causing the loop interference to the receiving antenna changes with the surrounding environment. By using the loop interference canceller 116, the influence of the loop interference that cannot be reduced by only the directivity of the antenna can be reduced.

Although the fourth embodiment is described for the case where the repeater has two transmitting antennas, the present invention is also applicable to the case where the number of transmitting antennas is greater than 2, in which case also, the influence of the loop interference that cannot be reduced by only the directivity of the antennas can be reduced.

Figure 8:
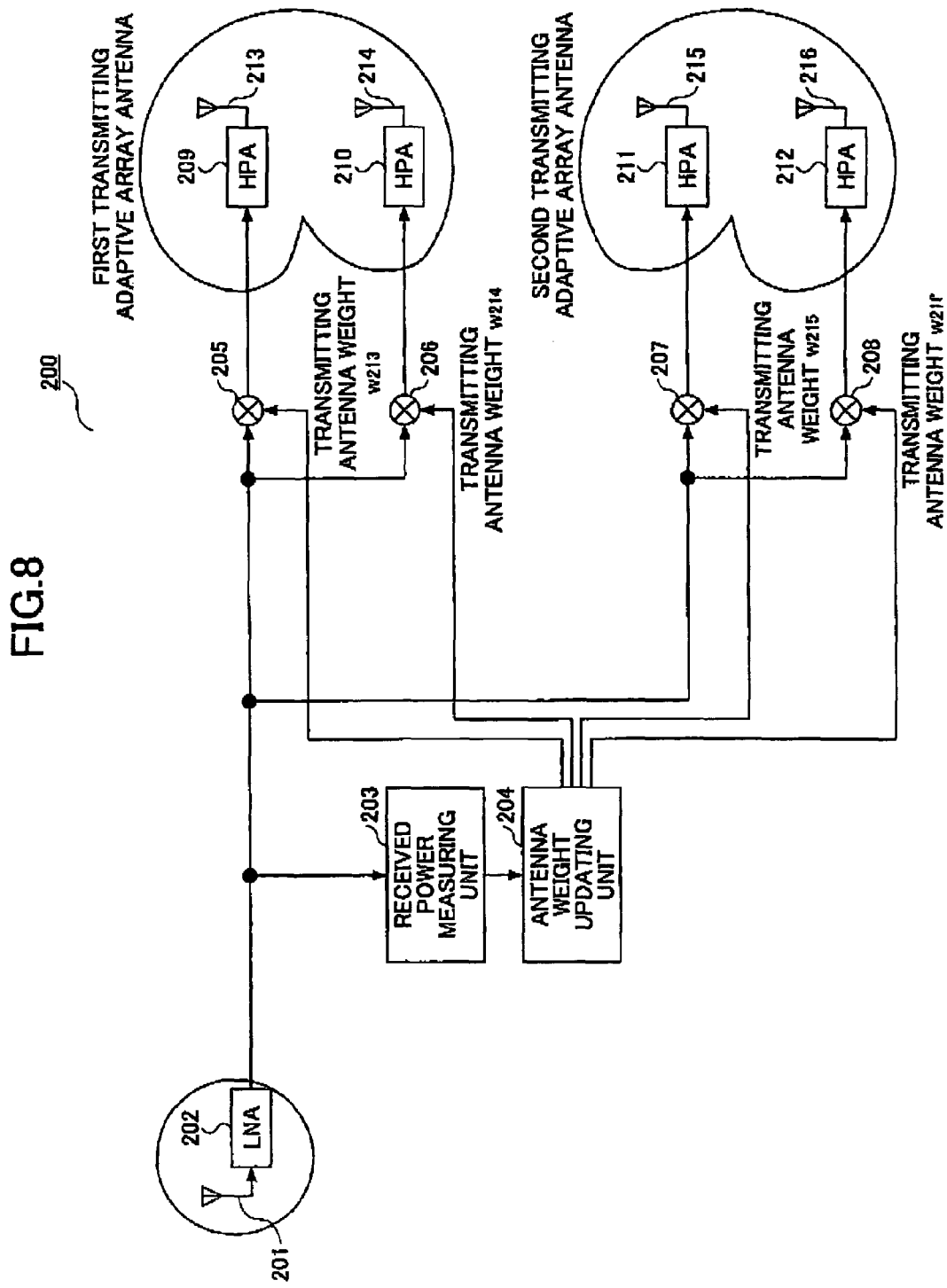
FIG. 8 is a block diagram showing the configuration of the repeater according to the embodiment of the present invention.

Next, a repeater 200 according to the fifth embodiment of the present invention is described with reference to FIG. 8.

The repeater 200 according to the fifth embodiment includes a receiving antenna 201, an LNA 202 connected to the receiving antenna 201, a received-power measuring unit 203 and multipliers 205 through 208 connected to the LNA 202, an antenna weight updating unit 204 connected to the received-power measuring unit 203 and the multipliers 205 through 208, HPAs 209 through 212 respectively connected to the multipliers 205 through 208, and transmitting antennas 213 through 216 respectively connected to the HPAs 209 through 212.

The repeater 200 according to the fifth embodiment controls the directivity of each transmitting antenna using a transmitting adaptive array antenna.

The transmitting adaptive array antenna is constituted by two or more antennas, and its directivity is controlled by multiplying a weighting factor called a transmitting antenna weight by a signal to be transmitted from each transmitting antenna. In the following description of the fifth embodiment, two transmitting adaptive array antennas are used, each transmitting adaptive array antenna consisting of two transmitting antennas.

The first transmitting adaptive array antenna is constituted by the transmitting antennas 213 and 214, to which transmitting antenna weights $W_{213}$ and $W_{214}$, respectively, are applied such that the directivity is controlled. Similarly, the second transmitting adaptive array antenna is constituted by the transmitting antennas 215 and 216, to which transmitting antenna weights $W_{215}$ and $W_{216}$, respectively, are applied such that the directivity is controlled.

Each transmitting adaptive array antenna is controlled such that the output in the radiation direction causing the loop interference is reduced, and that the output in other directions is as uniform as possible, By constituting the repeater in this way, an antenna pattern that is almost omni-directional is formed as the total transmitting antenna pattern by the first and second transmitting adaptive array antennas.

Further, by updating the transmitting antenna weights by the antenna weight updating unit 204, the directivity can be adaptively controlled. When the radiation direction from the transmitting antenna causing the loop interference changes with changes to the surrounding environment and propagation environment over time, the adaptive control can mitigate the influence of the loop interference by controlling the directivity according to the change.

Figure 9:
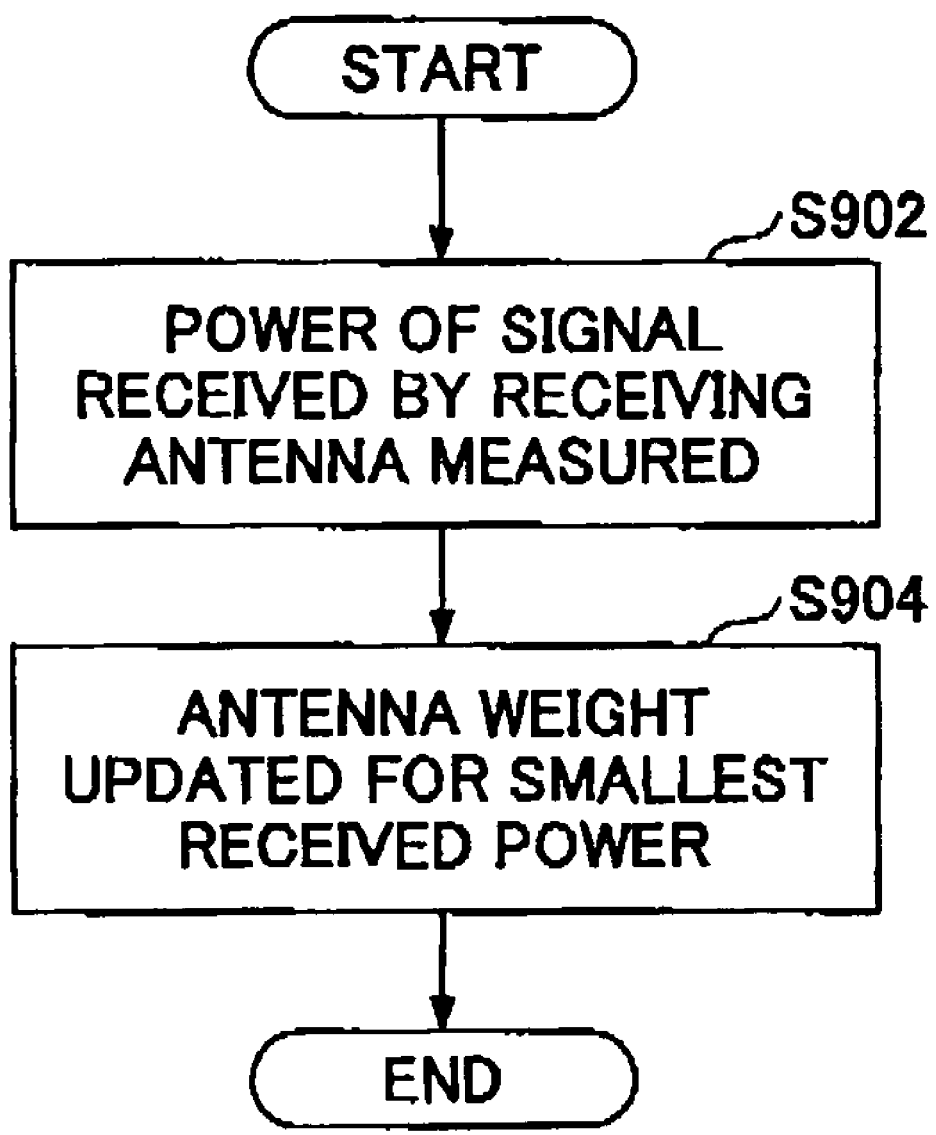
FIG. 9 is a flowchart showing operations of the repeater according to the embodiment of the present invention.

Updating of the transmitting antenna weight is described with reference to FIG. 9. The received power of the signal received by the receiving antenna 201 is measured by the received-power measuring unit 203 (Step S902). The antenna weight updating unit 204 updates the value of transmitting antenna weight so that the received power becomes small (Step S904). In this way, the output in the radiation direction causing the feedback can be reduced.

Here, in order to avoid all transmitting antenna weights becoming zero, it is necessary to provide a constraint condition. Methods to provide the constraint condition include setting a square sum of all transmitting antenna weights at a constant value, fixing a certain transmitting antenna weight at a predetermined value, and fixing a transmitting antenna weight of one antenna of each transmitting adaptive array antenna at a predetermined value. By using the constraint conditions as described above, the directivity that mitigates the influence of the loop interference is attained without all transmitting antenna weights becoming zero.

Further, the transmitting antenna weight can be updated using the signal transmitted by a transmitting station. Further, when transmission of the signal from the transmitting station is stopped, the transmitting antenna weight can be updated by transmitting the directivity adjustment signal from the repeater, as described in the third embodiment.

Figure 10:
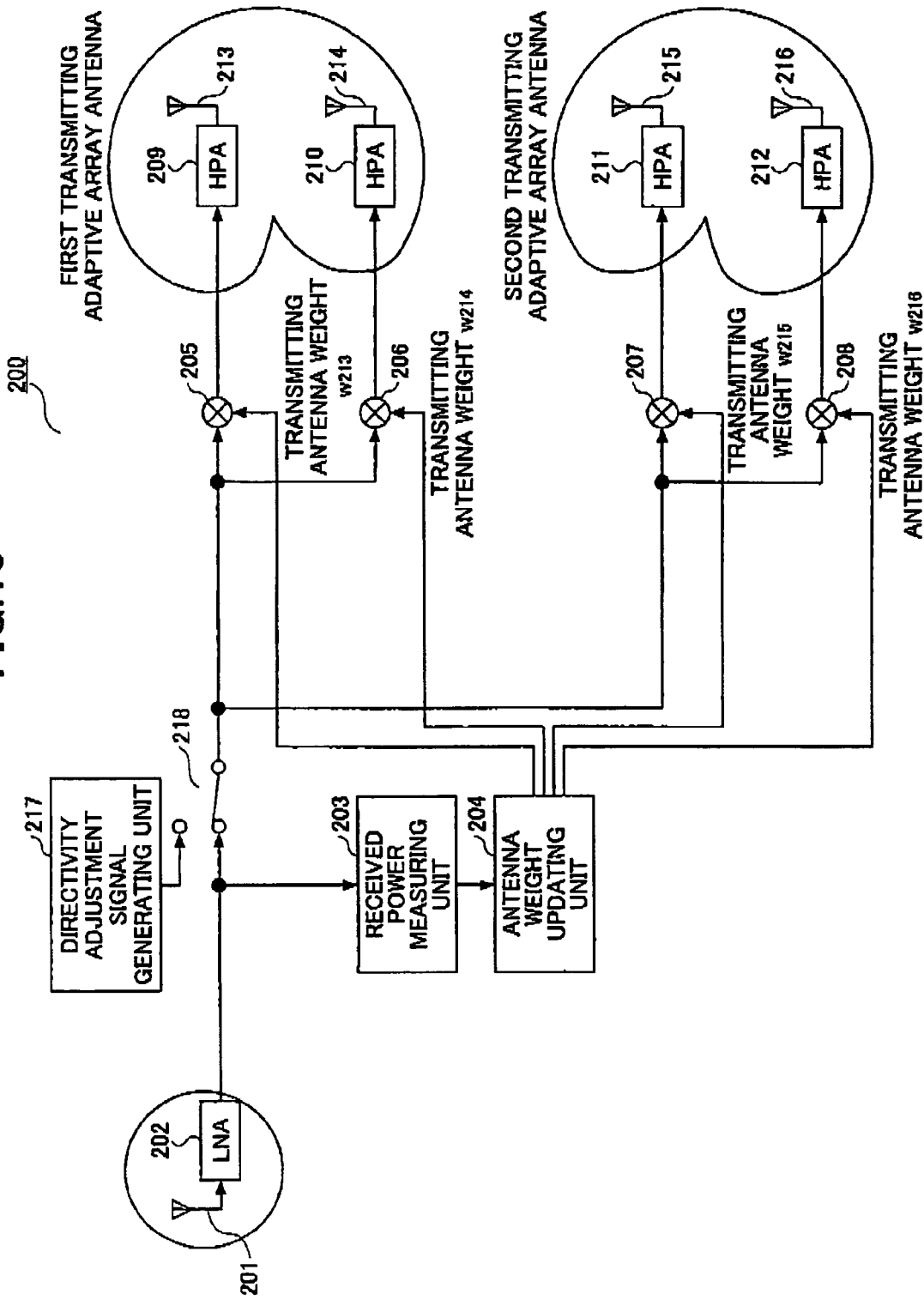
FIG. 10 is a block diagram showing the configuration of the repeater according to the embodiment of the present invention.

A repeater that includes the signal generating unit for directivity adjustment is described with reference to FIG. 10.

The repeater 200 shown in FIG. 10 includes a signal generating unit 217 for generating the directivity adjustment signal, and a switch 218 in addition to the repeater 200 described with reference to FIG. 8. The switch is connected to the multipliers 205 through 208, and is switched between the LNA 202 and the signal generating unit 217.

The signal generating unit 217 transmits the directivity adjustment signal through the transmitting antennas 213 through 216. The received power of the directivity adjustment signal at the receiving antenna 201 is measured by the received-power measuring unit 203. The antenna weight updating unit 204 updates each transmitting antenna weight according to the measured received power. For example, the antenna weight updating unit 204 updates the transmitting antenna weight so that received power may become small.

By constituting the repeater in this way, the directivity adjustment signal can be transmitted from the repeater, and the transmitting antenna weight is updated based on the directivity adjustment signal.

Figure 11:
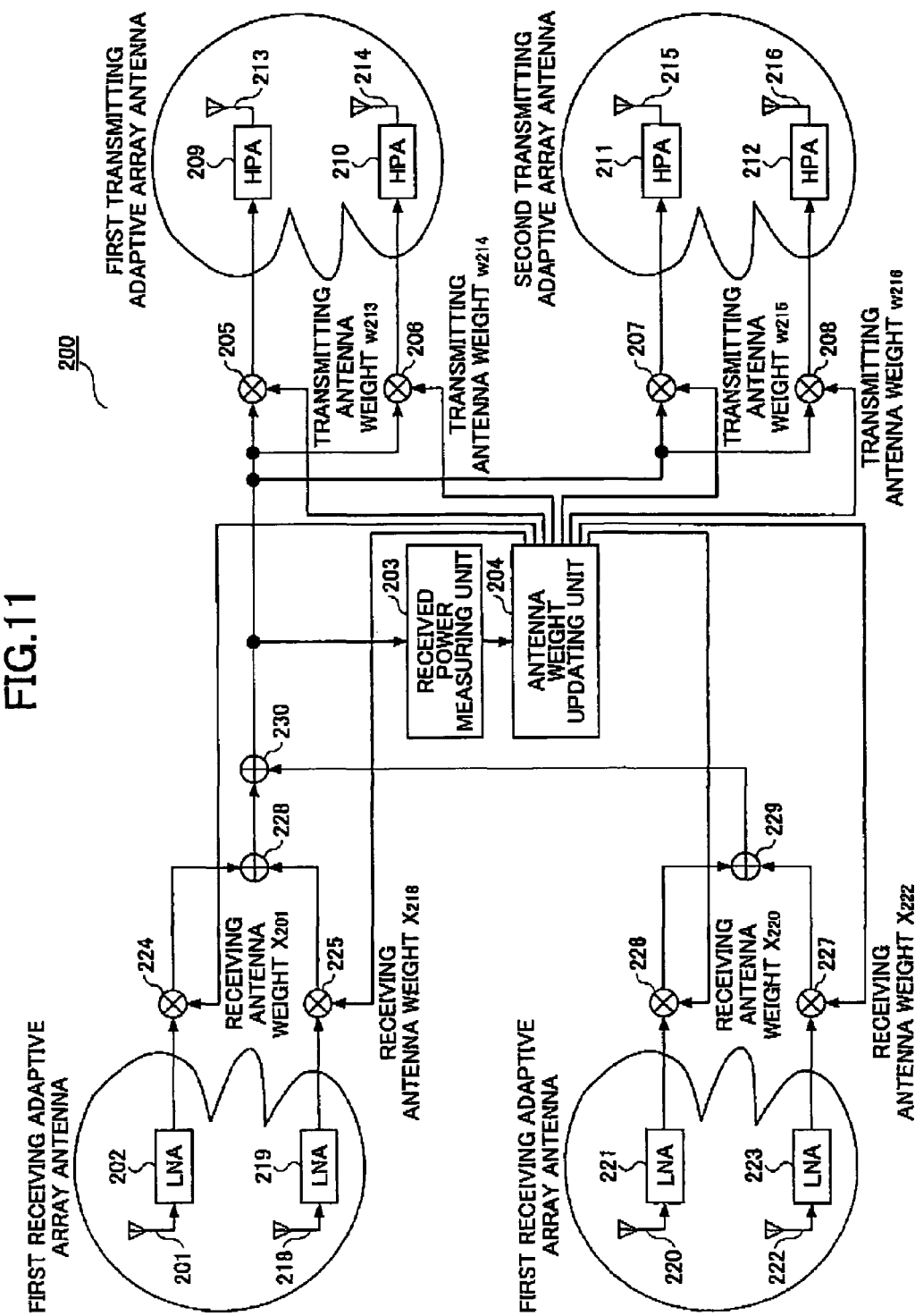
FIG. 11 is a block diagram showing the configuration of the repeater according to the embodiment of the present invention.

Although a repeater using two transmitting adaptive array antennas constituted by two transmitting antennas is described, the control is applicable to the case where the number of transmitting antennas that constitute a transmitting adaptive array antenna is greater than 2. In the case where the number of the transmitting adaptive array antennas is greater than 2, adaptive directivity control is also possible, and the influence of the loop interference, which changes over time, can be mitigated Next, a repeater according to the sixth embodiment of the present invention is described with reference to FIG. 11.

The repeater 200 according to the embodiment includes receiving antennas 201, 218, 220, and 222, LNAs 202, 219, 221, and 223 connected to the respective receiving antennas 201, 218, 220, and 222, multipliers 224, 225, 226, and 227 connected to the respective LNAs 202, 219, 221, and 223, an adder 228 connected to the multipliers 224 and 225, an adder 229 connected to the multipliers 226 and 227, an adder 230 connected to the adders 228 and 229, the received-power measuring unit 203 connected to the adder 230, the multipliers 205, 206, 207 and 208, the antenna weight updating unit 204 connected to the received-power measuring unit 203 and the multipliers 224, 225, 226, 227, 205, 206, 207, and 208, HPAs 209, 210, 211, and 212 connected to the respective multipliers 205, 206, 207, and 208, and the transmitting antennas 213, 214, 215, and 216 connected to the respective HPAs 209, 210, 211, and 212.

The receiving antennas of the repeater 200 according to the sixth embodiment are constituted by two or more adaptive array antennas, which is the difference from the repeater 200 described with reference to FIG. 8. The signal is received by the receiving adaptive array antennas, compounded, and transmitted from each transmitting adaptive array antenna. Like the fifth embodiment, the loop interference is reduced by the transmitting antennas being constituted by the adaptive array antennas, whereby the output in the direction of the receiving antennas is reduced.

The receiving antennas of the repeater 200 according to the sixth embodiment are constituted by the first and second receiving adaptive array antennas. The first receiving adaptive array antenna is constituted by receiving antennas 201 and 218, and the directivity is controlled by multiplying the received signals by receiving antenna weights $X_{201}$ and $X_{218}$, respectively. Similarly, the second receiving adaptive array antenna is constituted by receiving antennas 220 and 222, and the directivity is controlled by multiplying the received signals by receiving-antenna weights $X_{220}$ and $X_{222}$, respectively.

The directivity of each receiving adaptive array antenna is controlled such that the gain in the arrival direction of the loop interference is reduced, and the gain in other directions is made as uniform as possible.

By structuring the repeater in this way, the total antenna pattern formed by the first and the second receiving adaptive array antennas can be made almost omni-directional.

Further, the transmitting antenna weights and the receiving antenna weights are updated so that the power levels of the received signals as compounded become small, the signals being received by the receiving adaptive array antenna. At this juncture, in order to avoid all the transmission and receiving antenna weights being set to zero, it is necessary to use a constraint condition. As described in the fifth embodiment, methods to provide the constraint condition include setting the square sum of all transmitting antenna weights to a constant value, fixing a certain transmitting antenna weight at a predetermined value, and fixing a transmitting antenna weight of one antenna of each transmitting adaptive array antenna at a predetermined value.

In this way, the influence of the loop interference, which changes over time, can be reduced, and the repeater that provides the almost-omni-directional transmission and reception patterns can be realized.

Although the sixth embodiment is described for a repeater including two transmission antennas and the receiving adaptive array antennas, each of which is constituted by two antennas, the present invention is applicable to the case where the number of antennas that constitute each of the transmission and receiving adaptive array antennas is greater than 2, and the case where the number of each of the transmission and receiving adaptive array antennas is greater than 2. In such cases also, the influence of the feedback, which changes over time, is mitigated, and a repeater that provides almost-omnidirectional transmission and reception patterns can be realized.

Figure 12:
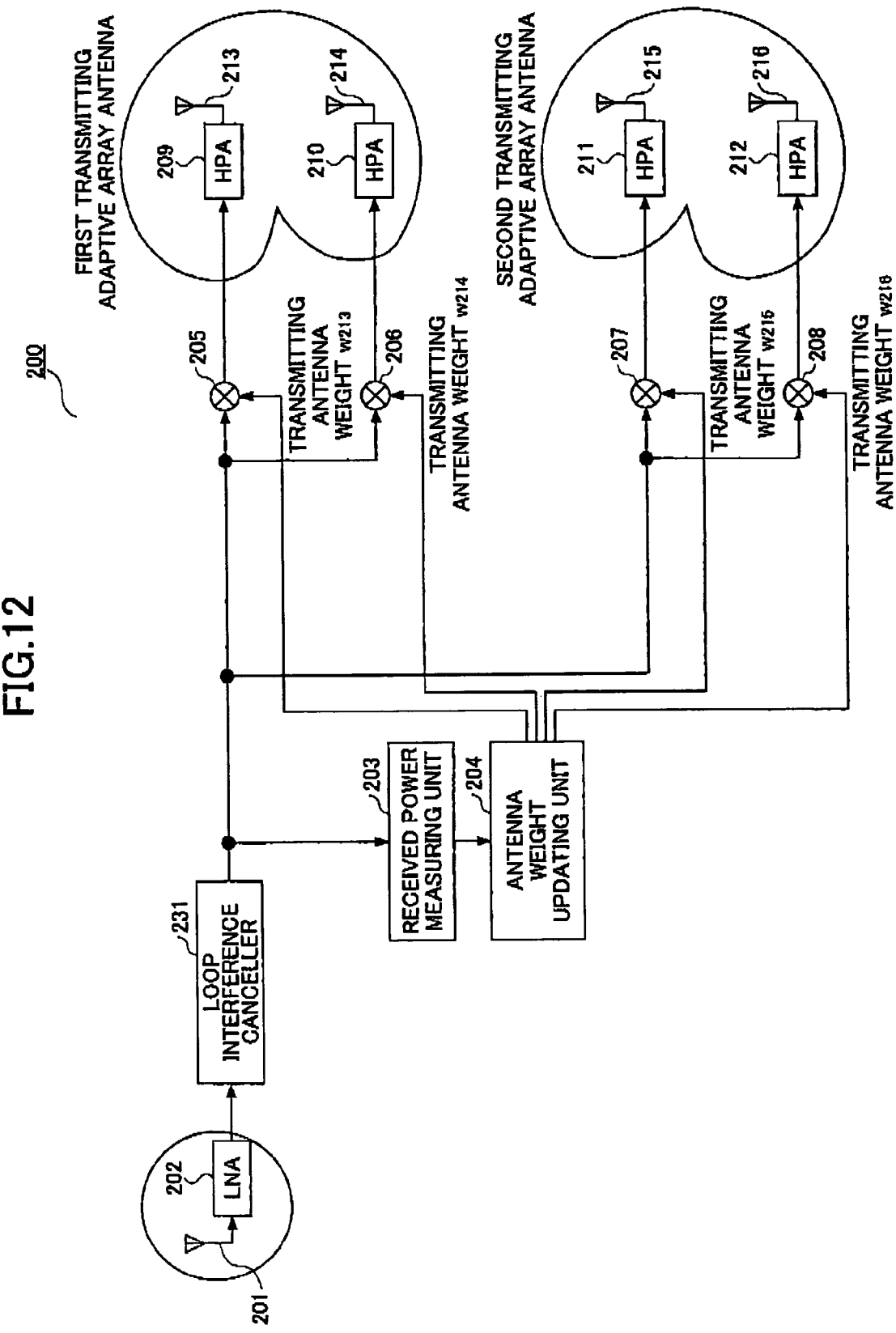
FIG. 12 is a block diagram showing the configuration of the repeater according to the embodiment of the present invention.

Next, the repeater according to the seventh embodiment of the present invention is described with reference to FIG. 12.

The repeater 200 according to the seventh embodiment includes a loop interference canceller 231 in addition to the repeater described with reference to FIG. B. The loop interference canceller 231 is connected to the LNA 202, the received-power measuring unit 203, and the multipliers 205, 206, 207, and 208.

The output of the loop interference canceller 231 is provided to the received-power measuring unit 203. The received-power measuring unit 203 measures the received power of the provided signal, and provides a measuring result to the antenna weight updating unit 204. The antenna weight updating unit 204 updates the transmitting antenna weight based on the provided result.

By constituting the repeater in this way, the influence of the loop interference, which cannot be mitigated by only directivity control of the transmitting adaptive array antenna, can be reduced.

Although the seventh embodiment is described for the case where the output of the loop interference canceller 231 is measured by the received-power measuring unit 203, and the transmitting antenna weight is updated by the antenna weight updating unit 204, the configuration can be such that the received-power measuring unit 203 measures the input to the loop interference canceller 231, and updates the transmitting antenna weight.

Figure 13:
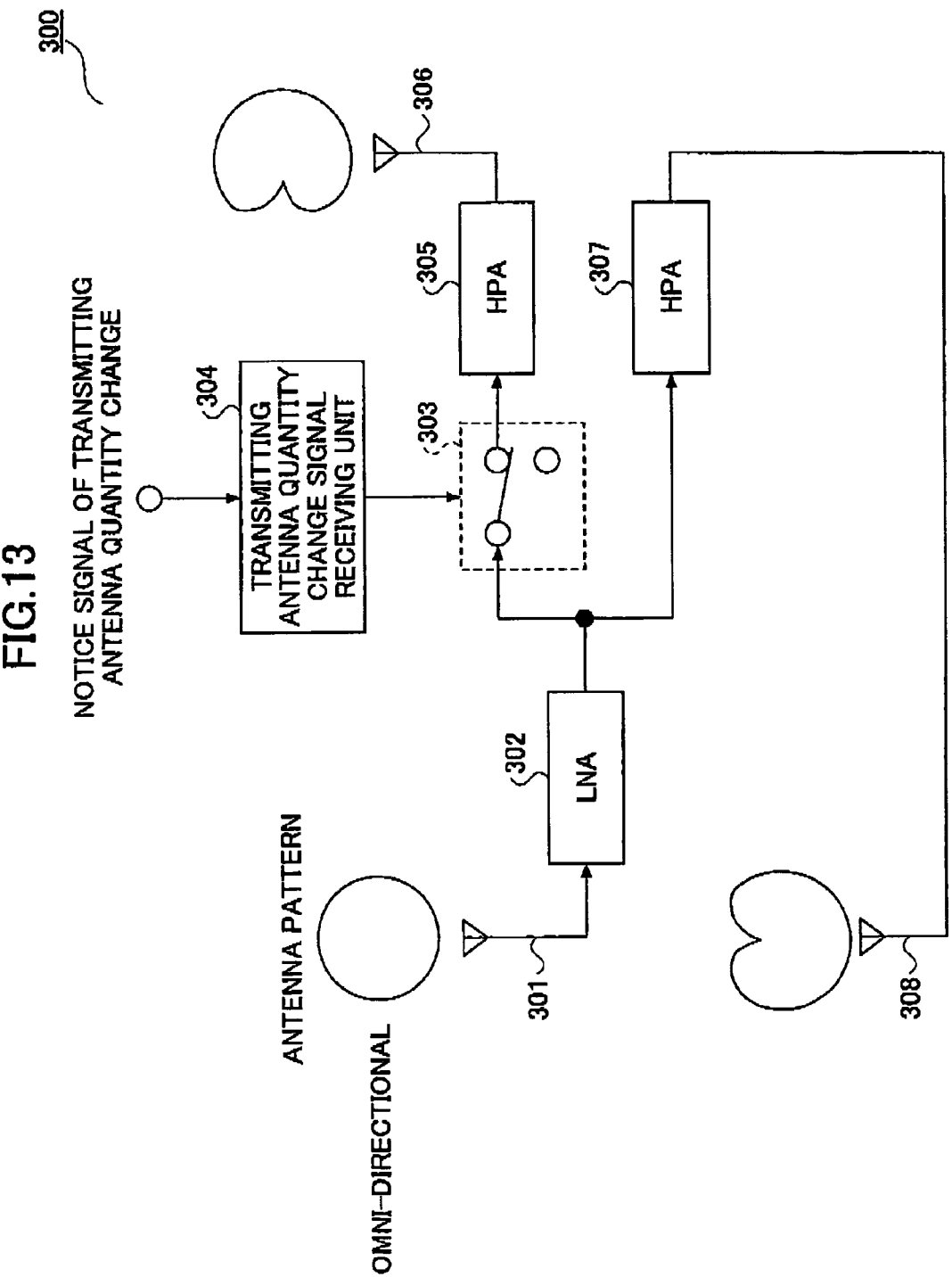
FIG. 13 is a block diagram showing the configuration of the repeater according to the embodiment of the present invention.

Next, a repeater 300 according to the eighth embodiment of the present invention is described with reference to FIG. 13.

The repeater 300 according to the eighth embodiment includes
a receiving antenna 301,
an LNA 302 connected to the receiving antenna 301,
an HPA 307 and a switch 303 connected to the LNA 302,
a transmitting antenna 308 connected to the HPA 307,
an HPA 305 and a transmitting antenna quantity change signal receiving unit 304 connected to the switch 303, and
a transmitting antenna 306 connected to the HPA 305.

The repeater 300 according to the eighth embodiment includes the transmitting antenna quantity change signal receiving unit 304, and the switch 303 for switching between transmitting and halting the transmission of the transmitting antenna 306. The transmitting antenna quantity change signal receiving unit 304 causes the switch 303 to switch between transmission and transmission halt of the signal from each transmitting antenna, for example in FIG. 13, the transmitting antenna 306 based on a notice signal of a transmitting antenna quantity change.

According to the repeater 300 described above, a receiving station receives signals through a number of paths (multi-path signals) regardless of the position of the receiving station, given that two or more transmitting antennas are used, and the omni-directional characteristic of the synthetic antenna pattern. Nevertheless, depending on the position of the receiving station in relation to the repeater, multi-path signals may be received by the receiving station even when the repeater uses only one transmitting antenna. In this case, the repeater stops transmission from other antennas.

In this way, interference at other receiving stations using the same frequency can be reduced, and operations of the HPAs connected to the non-operational transmitting antennas can be stopped, which reduces power consumption of the repeater.

Further, according to the embodiment, when the transmission from the transmitting antenna 306 is stopped, and when a receiving station moves and necessary communication quality is no longer available at the receiving station, the receiving station can still improve the receiving quality by sending the notice signal of the transmitting antenna quantity change to the repeater, and by causing the transmission from the transmitting antenna 306 to start.

Figure 14:
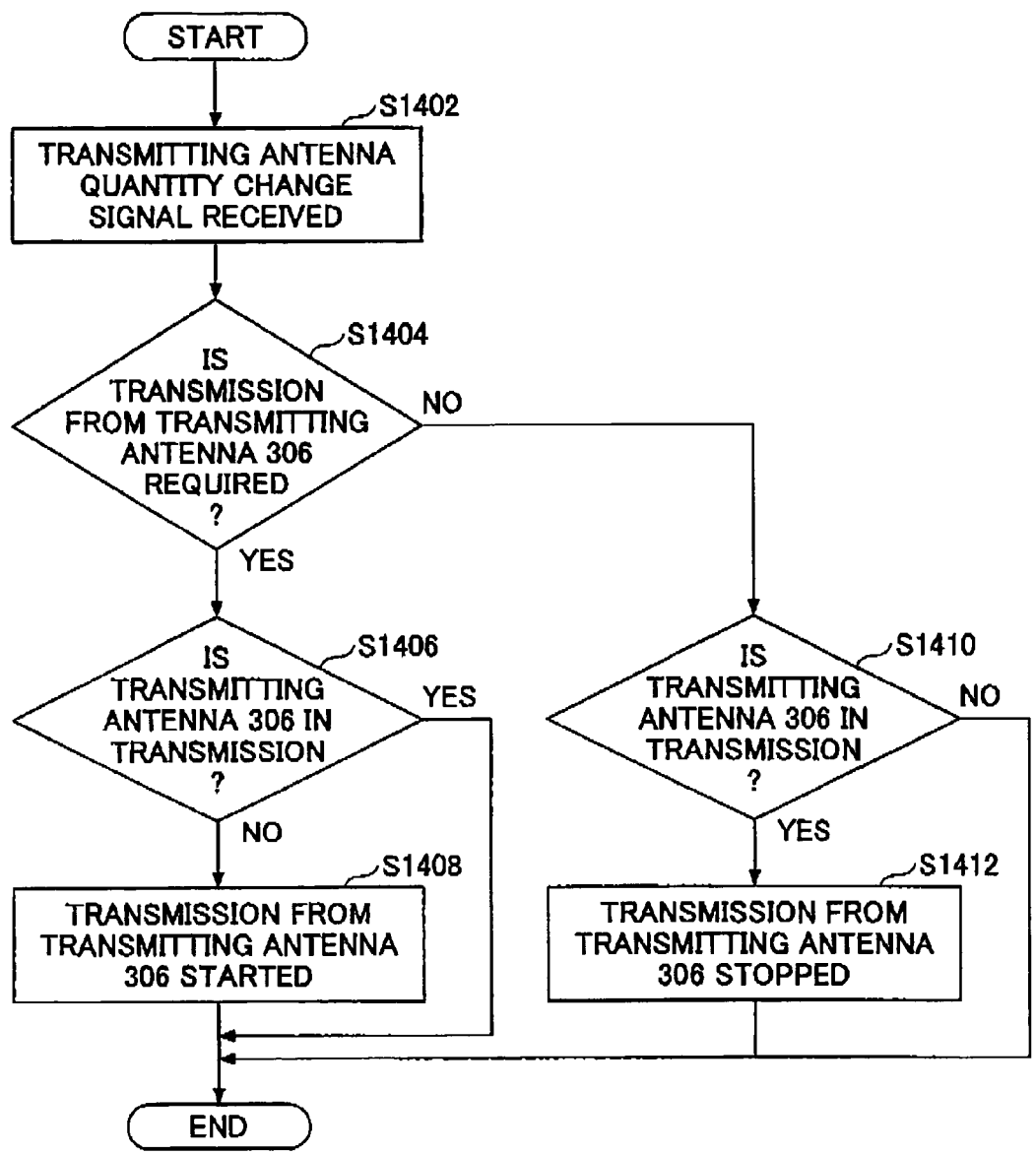
FIG. 14 is a flowchart showing operations of the repeater according to the embodiment of the present invention.

Next, operations of the repeater in a radio network according to the eighth embodiment are described with reference to FIG. 14.

The transmitting antenna quantity change signal receiving unit 304 receives the notice signal of the transmitting antenna quantity change. (Step S1402).

The transmitting antenna quantity change signal receiving unit 304 determines whether the received notice signal of the transmitting antenna quantity change is a signal that requires transmission from the transmitting antenna 306 (Step S1404). If affirmative (YES at Step S1404), the transmitting antenna quantity change signal receiving unit 304 determines whether the transmitting antenna 306 is performing transmission.

If transmission from the transmitting antenna 306 is not being performed (NO at Step S1406), the transmitting antenna quantity change signal receiving unit 304 causes the switch 303 to switch to the contact for performing transmission from the transmitting antenna 306, and the transmission from the transmitting antenna 306 is started (Step S1408). Otherwise, i.e., if the transmission from the transmitting antenna 306 is being performed (YES at Step S1406), no action is required.

In a case where the received notice signal of the transmitting antenna quantity change does not require transmission from the transmitting antenna 306 (i.e., when it is a signal that requires a transmission halt of the transmitting antenna 306) (NO at Step S1404), the transmitting antenna quantity change signal receiving unit 304 determines whether the transmission from the transmitting antenna 306 is being performed (Step S1410).

If affirmative (YES at Step S1410), the transmitting antenna quantity change signal receiving unit 304 stops the transmission from the transmitting antenna 306 by causing the switch 303 to turn to the contact for stopping the transmission from the transmitting antenna 306 (Step S1412). On the other hand, nothing is carried out if the transmission from the transmitting antenna 306 is not being performed (NO at Step S1410).

As described above, according to the present embodiment, transmission and transmitting halt of the transmitting antenna 306 are switched based on the notice signal of the transmitting antenna quantity change acquired by the transmitting antenna quantity change signal receiving unit 304.

A receiving station measures the received signal power and correlation between antennas of the received signal, and transmits the notice signal of the transmitting antenna quantity change that shows whether the number of transmission antennas to be used by the repeater is to be increased or decreased. The notice signal of the transmitting antenna quantity change is provided to the repeater directly in the radio network, or is once provided to the transmitting station using the radio network, and then provided to the repeater through the radio network or a wired network from the transmitting station. The repeater changes the number of antennas to be used based on the provided notice signal of the transmitting antenna quantity change.

In this way, when the signal is received with satisfactory signal properties, such as the power and the correlation, at the receiving station, the number of antennas used by the repeater is decreased, which reduces interference at other receiving stations using the same frequency. Further, the power consumption of the repeater can be reduced. Conversely, when the received signal property is not satisfactory at the receiving station, the signal property can be improved by increasing the number of the transmission antennas used by the repeater.

In the embodiment, although the repeater including two transmitting antennas is described, the present invention can apply to the case where the number of transmitting antennas is greater than 2, wherein transmission/transmission-halt of corresponding transmitting antennas is controlled, and the number of the transmitting antennas to be used can be adjusted. Consequently, when the signal is received with satisfactory signal properties, such as power and correlation, at the receiving station, the interference to other receiving stations using the same frequency can be reduced by reducing the number of antennas to be used by the repeater. Further, the power consumption of the repeater can be reduced. Further, when the signal is not received with a satisfactory property at the receiving station, the signal property at the receiving station can be improved by increasing the number of antennas to be used by the repeater.

Next, a radio communications system according to the ninth embodiment of the present invention is described with reference to FIGS. 15 through 18.

The radio communications system according to the embodiment includes a transmitting station 400, a receiving station 500, and a repeater 600.

Figure 15:
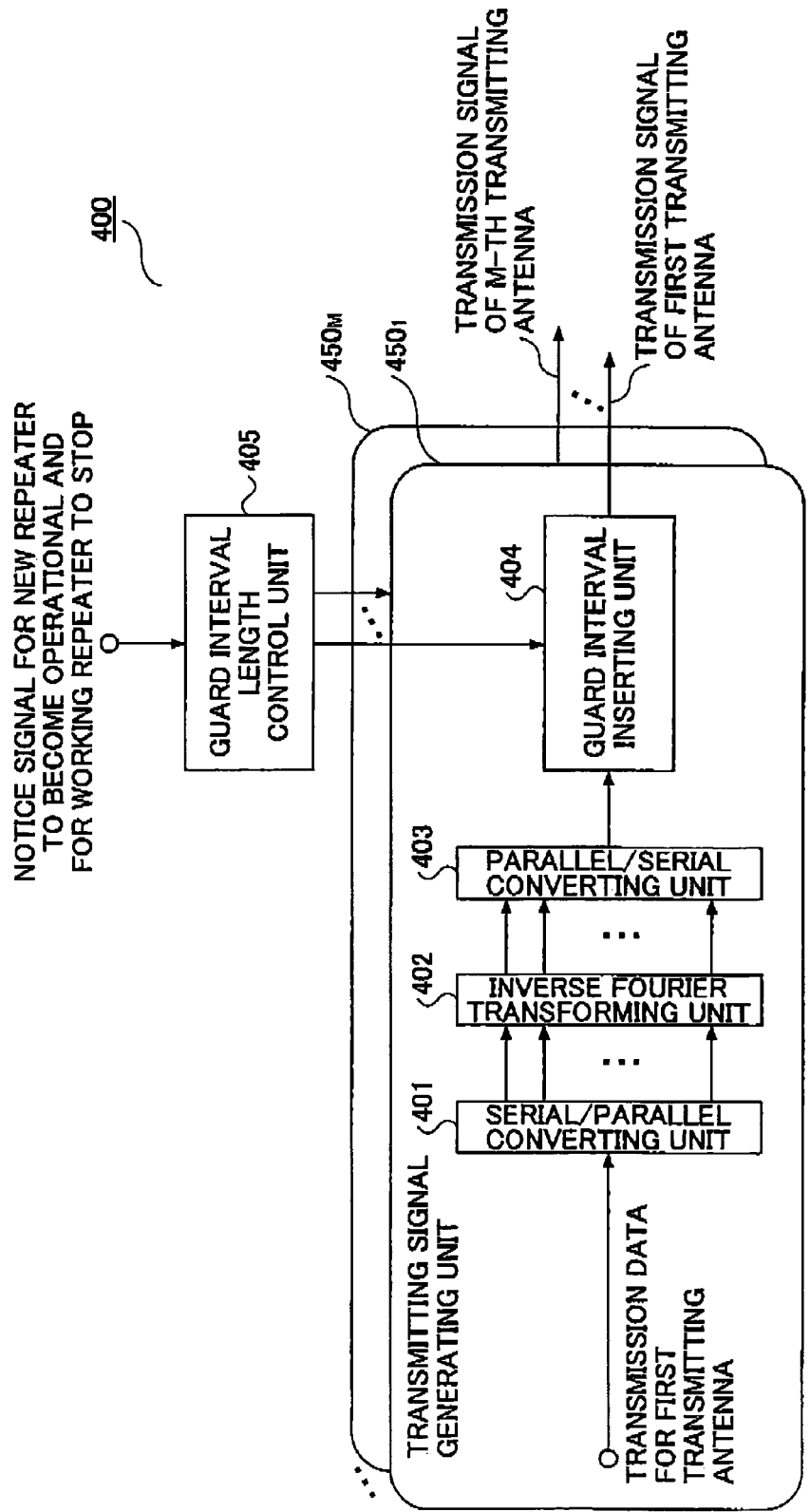
FIG. 15 is a block diagram showing the configuration of a transmitting station according to the embodiment of the present invention.

First, the transmitting station 400 according to the embodiment is described with reference to FIG. 15.

The transmitting station 400 according to the embodiment includes transmitting signal generating units $450_1$ through $450_M$ (M is a positive integer), and a guard interval length control unit 405 to which a notice signal is provided. The notice signal is for a new repeater to become operational and for a working repeater to stop. The guard interval length control unit 405 is connected to the transmitting signal generating units $450_1$ through $450_M$.

The transmitting signal generating unit $450_1$ includes a serial/parallel converting unit 401 to which transmit data are input, an inverse Fourier transforming unit 402 connected to the serial/parallel converting unit 401, a parallel/serial converting unit 403 connected to the inverse Fourier transforming unit 402, and a guard interval inserting unit 404 connected to the parallel/serial converting unit 403 and the guard interval length control unit 405, the guard interval inserting unit 404 outputting a transmitting signal. The transmitting signal generating units $450_2$ through $450_M$ have the same configuration as the transmitting signal generating unit $450_1$.

Figure 16:
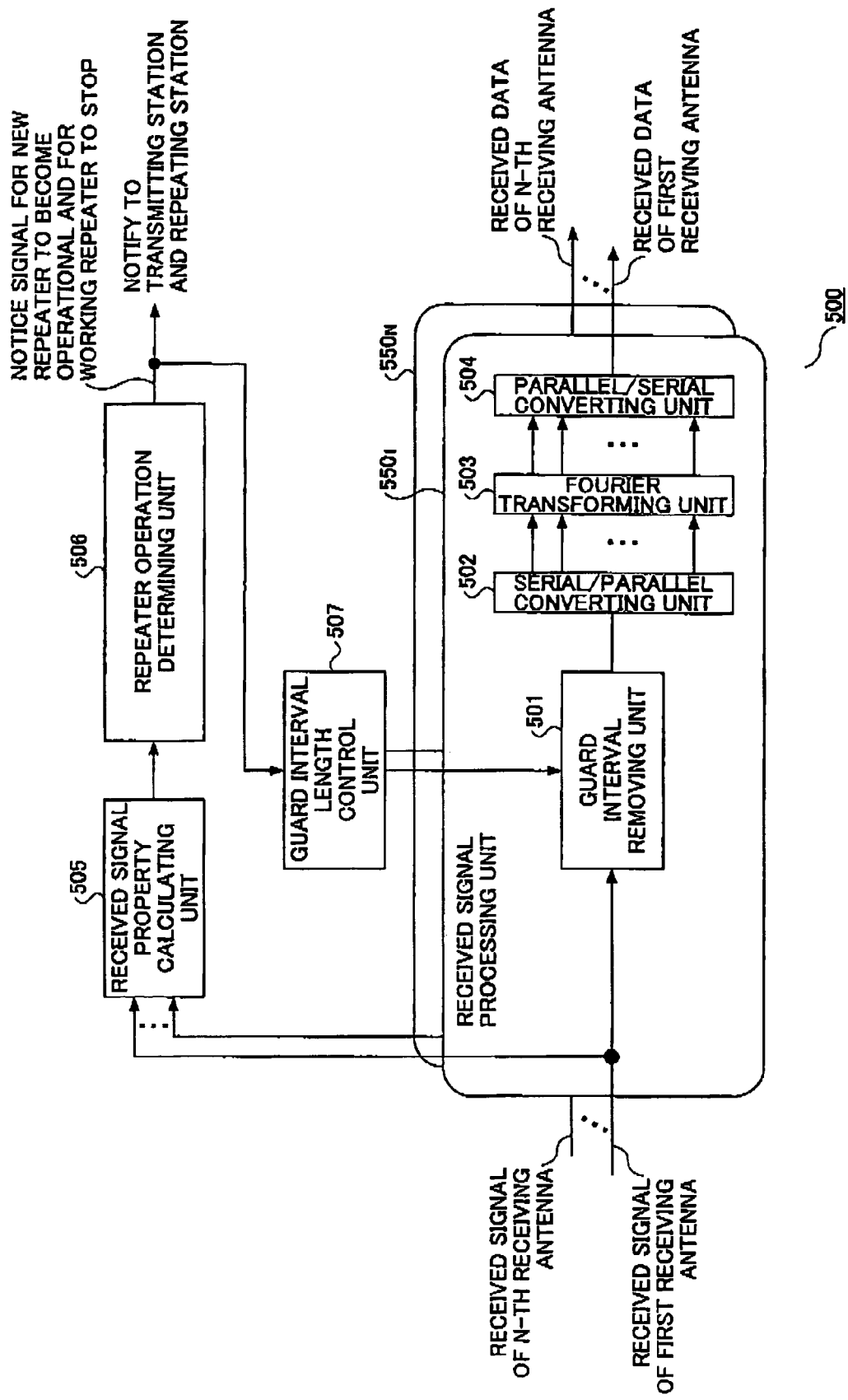
FIG. 16 is a block diagram showing the configuration of a receiving station according to the embodiment of the present invention.

Next, the receiving station 500 according to the embodiment is described with reference to FIG. 16.

The receiving station 500 according to the embodiment includes received signal processing units $550_1$ through $550_N$ (N is a positive integer), a received signal property calculating unit 505 to which a received signal is input, the received signal property calculating unit 505 being connected to the received signal processing units $550_1$ through $550_N$, a repeater operation determining unit 506 for providing the transmitting station and the repeater with the notice signal for a new repeater to become operational and for a working repeater to stop, the repeater operation determining unit S06 being connected to the received signal property calculating unit 505, and a guard interval length control unit 507 connected to the repeater operation determining unit 506 and the received signal processing units $550_1$ through $550_N$.

The received signal processing unit $550_1$ includes a guard interval removing unit 501 to which the received signal is input, the guard interval removing unit 501 being connected to the guard interval length control unit 507, a serial/parallel converting unit 502 connected to the guard interval removing unit 501, a Fourier transforming unit 503 connected to the serial/parallel converting unit 502, and a parallel/serial converting unit 504 for outputting received data, the parallel/serial converting unit 504 being connected to the Fourier transforming unit 503. The received signal processing units $550_2$ through $550_N$ have the same configuration as the received signal processing unit $550_1$.

Figure 17:
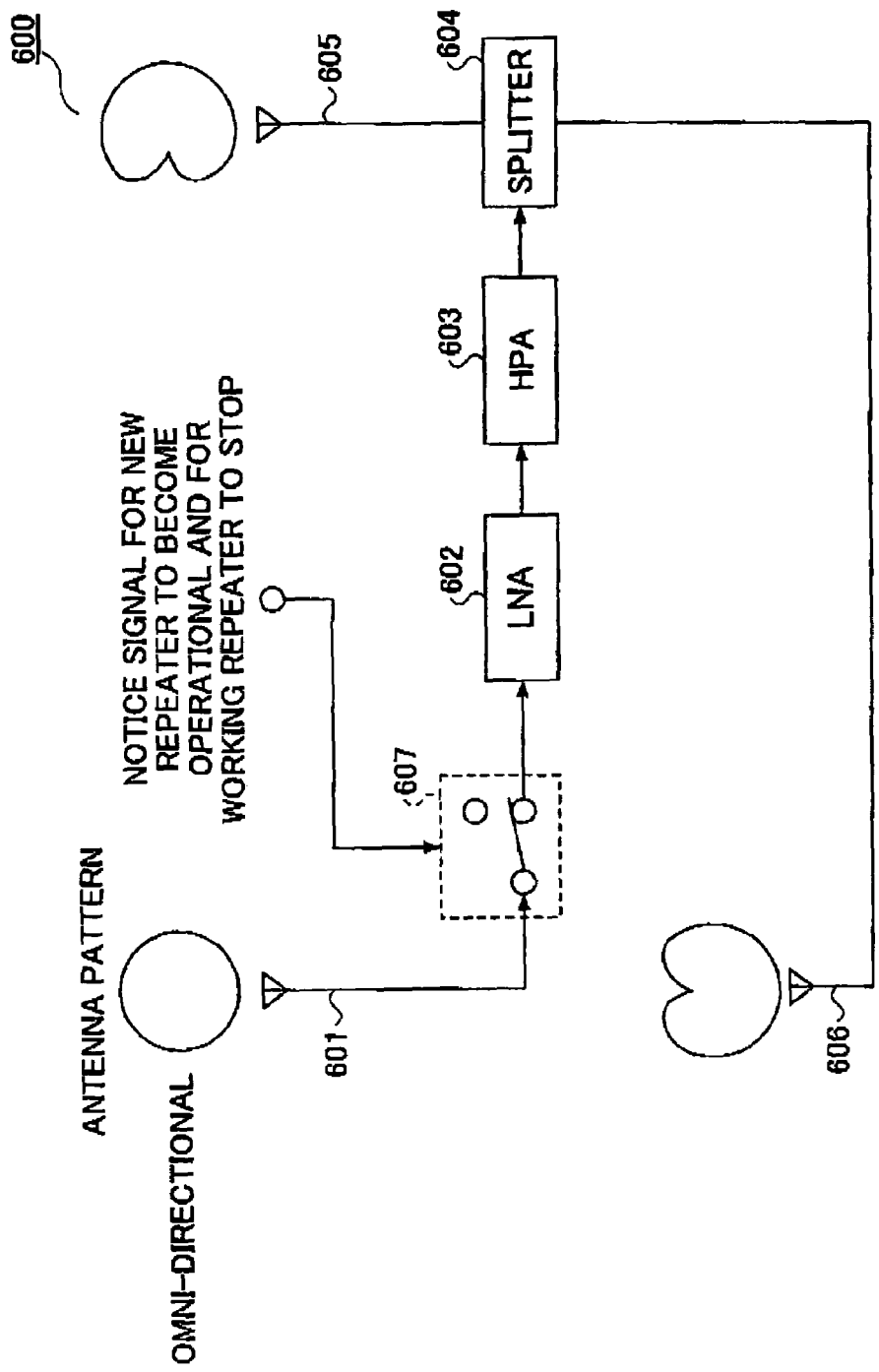
FIG. 17 is a block diagram showing the configuration of the repeater according to the embodiment of the present invention.

Next, the repeater 600 according to the embodiment is described with reference to FIG. 17.

The repeater 600 according to the embodiment includes a receiving antenna 601, a switch 607 to which the notice signal is provided, and that controls transmission/transmission-halt of the repeater, the notice signal being for a new repeater to become operational and for a working repeater to stop, the switch 607 being connected to the receiving antenna 601, an LNA 602 connected to the switch 607, an HPA 603 connected to the LNA 602, a splitter 604 connected to the HPA 603, and transmitting antennas 605 and 606 connected to the splitter 604.

The radio communications system according to the embodiment is a radio communications system using an OFDM (Orthogonal Frequency Division Multiplexing) method.

In addition to the directivity control of the transmitting antennas performed by the repeater 100 described with reference to FIG. 3, the repeater 600 according to the ninth embodiment controls transmission/transmission-halt of the repeater itself. The transmitting station 400 and the receiving station 500 control the guard interval length based on control of the repeater 600.

The transmitting station 400 according to the embodiment includes M transmitting antennas. For each of the transmitting antennas, serial/parallel conversion of the transmitting data is carried out by the serial/parallel converting unit 401, and an inverse Fourier transform is performed by the inverse Fourier transforming unit 402. Then, the transmitting data are converted into serial data by the parallel/serial converting unit 403, and a guard interval is added by the guard interval inserting unit 404. Here, the guard interval length is controlled by the guard interval length control unit 405 based on the notice signal for a new repeater to become operational and for a working repeater to stop.

The receiving station 500 according to the embodiment includes N receiving antennas. The portion that corresponds to the guard interval of a received signal is removed by the guard interval removing unit 501, and the signal received by each receiving antenna is converted into parallel signals by the serial/parallel converting unit 502. After Fourier transformation is performed by the Fourier transforming unit 503 and the parallel signals are converted into a serial signal by the parallel/serial converting unit 504, signal detection such as signal separation is performed.

Further, as for the receiving station 500, signal properties, such as received power and correlation between antennas, are calculated by the received signal property calculating unit 505 using the received signal by each receiving antenna. Based on the calculated signal property, the repeater operation determining unit 506 determines transmission or transmission-halt of the signal from the repeater 600, and signals the determination (i.e., the notice signal for a new repeater to become operational or for a working repeater to stop) to the transmitting station 400 and the repeater 600. Further, the receiving station 500 controls the guard interval length by the guard interval length control unit 507 based on the notice signal.

The repeater 600 according to the embodiment switches between transmission and transmission-halt of the repeater itself using the switch 607 based on the notice signal.

Next, an operations process of the radio communications system according to the embodiment is described with reference to FIG. 18.

The transmitting station 400 and the receiving station 500 communicate through the repeater 600 (Step S1802).

The receiving station 500 calculates signal properties, such as received power and correlation between the antennas, by the received signal property calculating unit 505 (Step S1804), and provides a result to the repeater operation determining unit 506. The repeater operation determining unit 506 determines transmission or transmission-halt of the signal of the repeater 600 based on the signal property of the input signal (Step S1806).

For example, the repeater operation determining unit 506 determines to start transmission from a repeater that is not operational, when received power is low, or when the correlation between the antennas is high. On the other hand, the repeater operation determining unit 506 determines to stop transmission from a repeater that is operating when received power is high, or when the correlation between the antennas is small.

Next, the notice signal for a new repeater to become operational and for a working repeater to stop is provided to the transmitting station 400 and the repeater 600 through the radio network from the receiving station 500 (Step S1808 and Step S1810).

Then, the repeater operation determining unit 506 provides the notice signal for a new repeater to become operational and for a working repeater to stop to the guard interval length control unit 507. The guard interval length control unit 507 controls the guard interval length based on the notice signal (Step S1812). For example, the guard interval length control unit 507 sets the guard interval length to the same length as the guard interval length used by the transmitting station 400.

At the transmitting station 400, after the notice signal is received, the guard interval length is controlled by the guard interval length control unit 405 (Step S1814). When performing transmission from the repeater 600, since the signal transmitted from the repeater 600 is received after a delay in comparison with the signal transmitted from the transmitting station 400, the guard interval length control unit 405 extends the guard interval length. The delay is caused by the process in the repeater 600. If the guard interval length is set up without consideration of the delay, the received signal property at the receiving station 500 is sharply degraded.

On the other hand, when stopping transmission from the repeater 600 that is transmitting, the guard interval length control unit 405 controls such that the guard interval length is shortened. Shortening the guard interval length is for raising transmission efficiency when the signal with the delay from the repeater 600 is not received by the receiving station 500.

The repeater 600 switches between transmission and transmission-halt of the signal from the repeater based on the notice signal (Step S1816). When the signal is received by the receiving station 500 with a satisfactory receiving property, the transmission from the repeater 600 is stopped such that the power consumption of the repeater 600 is reduced, and the interference at other receiving stations using the same frequency is reduced.

The transmitting station 400 transmits a transmitting signal by the updated guard interval length (Step S1818).

Although the embodiment is described for the case wherein the receiving station 500 determines transmission or transmission-halt of the repeater 600 based on the received signal property, a configuration can be such that one of the transmitting station 400 and the repeater 600 determines transmission or transmission-halt of the repeater 600.

When the transmitting station 400 makes the determination, the signal property at the receiving station 500 is determined to be poor based on the number of resending requests for the same packet in a packet communication using ARQ (Automatic Repeat Request), etc. In this case, the notice signal is provided through the radio network to the receiving station 500, and is provided to the repeater 600 through a wired network or the radio network.

In the case of the repeater 600 determining transmission or transmission-halt, the determination is based on the received power of the signal received at the repeater. Here, the control is such that if the received power is high, transmission is stopped, and if the received power is low, transmission is started. In this case, the notice signal is provided to the receiving station through the radio network, and is provided to the transmitting station through the radio network or a wired network.

As described above, according to the present embodiment, the transmission directivity and transmission/transmission-halt of the repeater 600 are controlled, based on which the guard interval lengths of the transmitting station 400 and the receiving station 500 are controlled. In this manner, when performing transmission from the repeater 600, the influence of the loop interference at the repeater can be reduced, and the control of the guard interval length can protect against degradation of the receiving quality at the receiving station.

Further, when stopping the transmission from the repeater, transmission efficiency can be improved by shortening the guard interval length, and interference at other receiving stations using the same frequency can be reduced.

As described above, according to the embodiment, the influence of the loop interference at the repeater is reduced, and an almost-omni-directional antenna pattern is obtained.

ADAPTABILITY TO INDUSTRY

The repeating station, the communication apparatus, and the directivity control method according to the present invention are applicable to a mobile communications system.

Further, the present invention is not limited to these embodiments, but variations and modifications may be made without departing from the scope of the present invention.

The present application is based on Japanese Priority Application No. 2004-198049 filed on Jul. 5, 2004 with the Japanese Patent Office, the entire contents of which are hereby incorporated by reference.

What is claimed is:

1. A repeating station comprising:
   a first antenna group including at least one antenna element;
   a second antenna group that is different from the first antenna group, the second antenna group including a plurality of antenna elements;
   a plurality of signal generating units, each corresponding to one of said antenna elements of the second antenna group, configured to generate a directivity adjustment signal to be transmitted from each of the antenna elements of the second antenna group,
   a received power measuring unit configured to measure the radiated power of signals transmitted by the second antenna group and received by the first antenna group; and
   a weight calculating unit configured to calculate transmission weights to be multiplied by corresponding signals to be transmitted from the antenna elements of the second antenna group such that the radiated power is reduced in a direction that causes a feedback to the first antenna group, and such that the radiated power is made uniform in other directions,
   wherein the adjustment is performed by the weights, wherein the weight calculating unit calculates the transmission weights based on at least one of
   making a sum of squares of all transmission weights a fixed value,
   making one certain transmission weight a fixed value, and
   making a transmission weight of one antenna element of each of a plurality of adaptive array antennas included in the second antenna group a fixed value, and each of said plurality of antenna elements of the second antenna group is adjusted so that radiated power in the direction of the first antenna group is reduced.

2. The repeating station as claimed in claim 1, wherein the antenna elements that constitute the second antenna group are arranged so that an antenna pattern that is synthetically formed by the antenna elements becomes omni-directional.

3. The repeating station as claimed in claim 1, further comprising:
   a received power measuring unit configured to measure received power of the directivity adjustment signal received at the first antenna group; and
   a directivity control unit configured to control the directivity of each of the plurality of antenna elements of the second antenna group based on the received power.

4. The repeating station as claimed in claim 1, further comprising:
   a transmitting antenna quantity change signal receiving unit configured to receive a notice signal of a transmitting antenna, said signal used to determine whether the number of antenna elements to be used by the repeating station is to be changed based on communication quality.

5. The repeating station as claimed in claim 1, further comprising:
   a signal generating unit configured to generate a directivity adjustment signal to be transmitted from each of the antenna elements of the second antenna group.

6. The repeating station as claimed in claim 1, wherein the first antenna group includes a plurality of adaptive array antennas, each of which adaptive array antennas includes a plurality of antenna elements; and
   the weight calculating unit calculates receiving weights that are multiplied by corresponding received signals so that gain in an arrival direction of a loop interference from the second antenna group is reduced, and the gain in other directions is made uniform based on the received power.

7. The repeating station as claimed in claim 6, wherein the weight calculating unit calculates the receiving weights based on at least one of making a sum of squares of all receiving weights a fixed value, making one certain receiving weight a fixed value, and making a receiving weight of one antenna element of each of the adaptive array antennas a fixed value.

8. The repeating station as claimed in claim 1, further comprising:
   a loop interference canceling unit configured to cancel a signal fed back to the first antenna group from the second antenna group.

9. The repeating station as claimed in claim 1, further comprising:
   a transmitting start/halt control unit configured to control a transmitting start and a transmitting halt based on a signal that indicates a transmitting start and transmitting halt of a transmitting signal.

10. A communication apparatus comprising:
    a received signal property calculating unit configured to calculate a property of a received signal;
    a determining unit configured to determine whether to start or stop transmission of a transmission signal from a repeating station based on the property of the received signal; and
    a transmission guard interval length control unit configured to control the guard interval length for transmission data based on a processing delay at the repeating station and a signal that indicates whether to start or stop transmission of a transmission signal from another communication apparatus and transmitted from the repeating station.

11. The communication apparatus as claimed in claim 10, wherein the received signal property calculating unit is further configured to calculate at least one of received power and antenna correlation as the property of the received signal using the signal received by a receiving antenna.

12. The communication apparatus as claimed in claim 10, further comprising:
    a guard interval length control unit configured to control a guard interval length based on a result of the determining unit.

13. The communication apparatus as claimed in claim 10, further comprising:
    a transmitting antenna quantity change signal receiving unit configured to receive a notice signal of a transmitting antenna, said signal used to determine whether the quantity of the antenna elements to be used by the repeating station is to be changed based on communication quality.

14. A directivity control method for a repeating station, comprising:
    transmitting a directivity adjustment signal from each of a plurality of antenna elements of a second antenna group, said directivity adjustment signal being generated at a plurality of signal generating units, each corresponding to one of said plurality of antenna elements;
    measuring received power of the directivity adjustment signal received by a first antenna group including at least one antenna element;

adjusting the directivity of each of the plurality of antenna elements of the second antenna group based on the received power;

measuring the radiated power of signals transmitted by the second antenna group and received by the first antenna group; and calculating transmission weights to be multiplied by corresponding signals to be transmitted from the antenna elements of the second antenna group such that the radiated power is reduced in a direction that causes a feedback to the first antenna group, and such that the radiated power is made uniform in other directions, wherein the adjusting step is performed by the weights, and the calculating step calculates the transmission weights based on at least one of making a sum of squares of all transmission weights a fixed value, making one certain transmission weight a fixed value, and making a transmission weight of one antenna element of each of a plurality of daptive array antennas included in the second antenna group a fixed value.

* * * * *